(12) United States Patent
Collins, Jr. et al.

(10) Patent No.: US 6,388,815 B1
(45) Date of Patent: May 14, 2002

(54) DEVICE AND METHOD FOR PRODUCING OPTICALLY-CONTROLLED INCREMENTAL TIME DELAYS

(75) Inventors: Stuart Collins, Jr., Worthington; Betty Lise Anderson, Gahanna, both of OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/645,136

(22) Filed: Aug. 24, 2000

(51) Int. Cl.[7] .............................. G02B 27/14; G02F 1/00
(52) U.S. Cl. ...................... 359/633; 359/631; 359/237; 359/291; 359/290
(58) Field of Search ................................ 359/290, 291, 359/245, 237, 871, 629, 631, 633; 385/140; 310/306, 307

(56) References Cited

U.S. PATENT DOCUMENTS

| | | | | |
|---|---|---|---|---|
| 4,225,938 A | * | 9/1980 | Turpin | 708/816 |
| 4,474,434 A | | 10/1984 | Carlsen et al. | 359/320 |
| 4,474,435 A | | 10/1984 | Carlsen et al. | 359/320 |
| 5,117,239 A | * | 5/1992 | Riza | 342/375 |
| 5,319,477 A | * | 6/1994 | DeJule | 359/42 |
| 5,463,497 A | | 10/1995 | Muraki et al. | 359/619 |
| 5,465,175 A | | 11/1995 | Woodgate et al. | 359/619 |
| 5,512,907 A | | 4/1996 | Riza | 342/375 |
| 5,936,759 A | | 8/1999 | Buttner | 359/291 |
| 6,064,506 A | | 5/2000 | Koops | 359/237 |
| 6,266,176 B1 | * | 7/2001 | Anderson | 359/245 |

OTHER PUBLICATIONS

Collins, Jr et al., Optical True Time Delay for Phased Array Antennas Based on the White Cell, GOMA, Monterey, California, 4 pp. (Mar., 1999).
Anderson et al., Design Advances in Free–Space Optical True–Time Delay Device, PSAA–8, Monterey, California, 4 pp. (Jan., 1998).
Anderson et al., Binary–Counting True Time Delay Generator Using a White Cell Design and Deformable Mirror Devices, LEOS, Orlando, Florida, 2 pp. (Dec., 1998).
Anderson et al., Highly Parallel Optical Device to Produce True Time Delays for Phased Array Antennas, Allerton, 14 pp. (Sep., 1998).
Anderson et al., Optically Produced True–Time Delays for Phased Antenna Arrays, Applied Optics, vol. 36, No. 32, pp. 8493–8503 (Nov. 1997).
Collins et al., Optics for Numerical Calculation, Proceedings of ICO–11 Conference, Madrid, Spain (1978).
Collins, Numerical Optical Data Processor, SPIE vol. 128, Effective Utilization of Optics in Radar Systems, pp. 313–319 (1977).
Collins et al., Numerical Optical Data Processing, Proceedings of the 1978 International Optical Computing Conference, London, England, pp. 194–197 (Sep., 1978).
Yen et al., Operation of a Numerical Optical Data Processor, International Optical Computing Conference, SPIE Proceedings, vol. 232, 8 pp. (1980).

* cited by examiner

Primary Examiner—Georgia Epps
Assistant Examiner—Gary O'Neill
(74) Attorney, Agent, or Firm—Standley & Gilcrest LLP

(57) ABSTRACT

The present invention includes time delay devices and time delay systems. The invention also includes machines and instruments using those aspects of the invention. The invention may also be used to upgrade, repair, or retrofit existing machines or instruments, using methods and components known in the art. The present invention comprises a true time device that falls into the free-space category but uses a multiple-pass optical cell with refocusing mirrors that has the advantage of avoiding beam-spreading problems. This approach differs from previous free-space approaches in that it uses only one optical switch or spatial light modulator instead of one or more switches for each bit. In one approach, a microwave signal for each antenna element may be modulated onto an optical beam. After the individual optical beams are delayed by the desired amount of time through the system, the signals may then be down-converted to microwave signals for further processing. This process may be used in either the transmit or the receive mode of a phased array radar.

27 Claims, 17 Drawing Sheets

DEVICE AND METHOD FOR PRODUCING OPTICALLY-CONTROLLED INCREMENTAL TIME DELAYS

TECHNICAL FIELD OF THE INVENTION

The present invention is in the field of time delay devices, such as those that may be used for the control of phased-array radars, communication systems, or correlators.

BACKGROUND OF THE INVENTION

This invention relates to apparatus for producing true-time delay devices, such as those useful in the control of phased array radars. It is desirable to use a system that produces signals to control the timing of the emission of each of a plurality of electromagnetic radiation beams, delaying each of them in time by some time increment. The delay in each signal should be capable of being controlled independently of the other signals.

Phased array radars have the advantage that the radar beams can be steered electronically by changing the phase or timing of the signal radiated by the individual elements of the array. Often, this is accomplished by controlling the phase of the signals applied to the array elements. This procedure introduces undesirable squint if very short pulses or broad bandwidths are required. True time delay offers a scheme for controlling the elements without squint even with broadband signals.

Electronically implementing the true time delays is generally impractical because of the need for many long lengths of strip line, waveguides, or coaxial cable, which are expensive, bulky, and temperature sensitive. Because long paths are comparatively easy to obtain optically, photonic systems present a means of obtaining the beam agility of array systems combined with wide bandwidth. Approaches to true time delay tend to fall into two categories: those using fibers and those using long free-space paths. Some fiber approaches use multiple optical switches or broadcast the light over all possible paths at once. Wavelength-division-multiplexing schemes have recently been developed by use of fiber Bragg gratings. Free-space systems have also used multiple optical switches for switching the beams between sequential optical paths. These optical switches are usually liquid-crystal based.

It is therefore an object of the current invention to create a device for optically generating true time delays that is inexpensive, is compact in design, and is sufficiently temperature insensitive.

Although described with respect to the field of phased-array radars, it will be appreciated that similar advantages of optically producing true-time delays, as well as other advantages, may obtain in other applications of the present invention. Such advantages may become apparent to one of ordinary skill in the art in light of the present disclosure or through practice of the invention.

SUMMARY OF THE INVENTION

The present invention includes time delay devices and time delay systems. The invention also includes machines and instruments using those aspects of the invention. The invention may also be used to upgrade, repair, or retrofit existing machines or instruments, using methods and components known in the art.

The present invention comprises a true time device that falls into the free-space category but uses a multiple-pass optical cell with refocusing mirrors that has the advantage of avoiding beam-spreading problems. This approach differs from previous free-space approaches in that it uses only one optical switch or spatial light modulator instead of one or more switches for each bit. In this approach the microwave signal for each antenna element may be modulated onto an optical beam. After the individual optical beams are delayed by the desired amount of time, the signals may then be down-converted to microwave signals for further processing. This process may be used in either the transmit or the receive mode of the phased array radar.

In broadest terms, the device for producing optically-controlled incremental time delays of the present invention comprises: (1) an input device selected from the group comprising light sources adapted to generate individual light beams or arrays of light beams from one or several directions, (2) an adjustable input mirror capable of reflecting light from the input device in different directions, (3) a set of optical elements selected from the group consisting of mirrors, lenses, filters and prisms placed in a configuration so as to define a multitude of light paths for each light beam from the input device reflected by the adjustable input mirror, (4) at least one refocusing element to restrict the divergence of a light beam diverted through at least one of the light paths, (5) a spatial light modulator adapted to select a path from among the light paths for each pass through the set of optical elements of an individual light beam from the input device, (6) an output mirror adapted to reflect the light beams emerging from the set of optical elements, and (7) a receiving device capable of responding to the delays in the light beams reflected by the output mirror.

The device for producing optically-controlled incremental time delays of the present invention may also include at least one system of optical transmission lines or waveguides wherein the lengths of the light paths may be varied in a confined space consisting of a subset of the optical elements. The spatial light modulator may consist of a polarizing spatial light modulator which changes the polarization of individual light beams directed to the spatial light modulator. The use of a polarizing spatial light modulator then may require the addition of a beam-splitting device that can direct light beams through the system of optical elements in multiple directions depending on the polarization of the light beams after passing through the polarizing spatial light modulator. The device may alternatively include a micro-mechanical or deformable mirror device spatial light modulator capable of reflecting the individual light beams in multiple directions, thereby determining the optical path.

The light sources adapted to generate individual light beams or arrays of light beams from one or several directions may include such devices as lasers, arc lamps, and light emitting diodes. The receiving devices capable of responding to the delays may include devices such as photodetectors, pin diodes, photodiodes, and interferometers.

DETAILED DESCRIPTION OF THE PREFERRED EMBODIMENT(S)

In accordance with the foregoing summary, the following presents a detailed description of the preferred embodiment of the invention that is currently considered to be the best mode.

Figure 1:
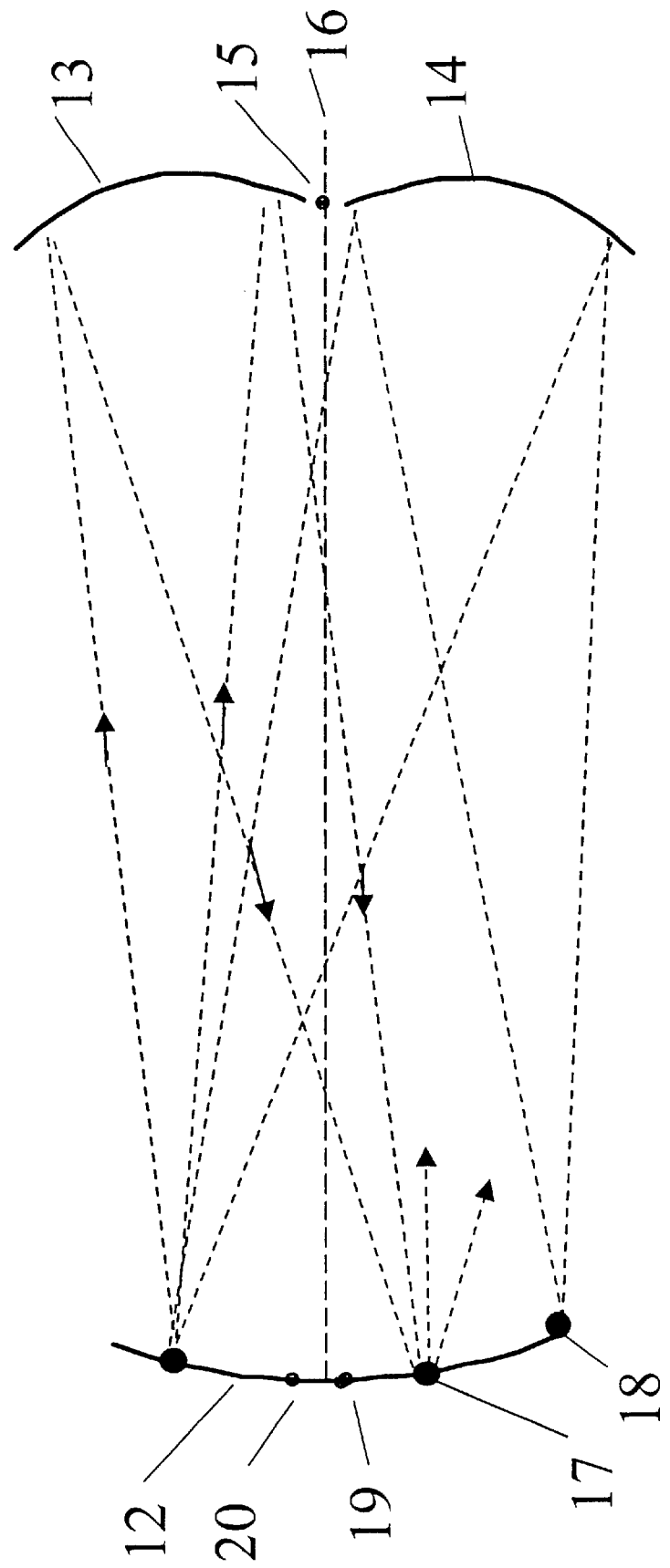
FIG. 1 is a top view of a standard White cell on which the present invention is based.

The present invention is based on the traditional White cell. FIG. 1 is a diagram of the path of a light beam passing through a White cell. The cell comprises three identical spherical mirrors, all of the same radius of curvature. The first mirror 12 is separated from the second 13 and third 14 mirrors by a distance equal to their radii of curvature. The center of curvature 15 of the first mirror lies on the centerline or optical axis 16 and falls between the second and third mirrors. The second and third mirrors are aligned so that the center of curvature 20 of the second mirror 13 and the center of curvature 19 of the third mirror 14 land on the first mirror, for example an equal distance from the optical axis. Light from the second mirror is imaged onto the third mirror, and vice versa. Light is input onto a spot 18 in the plane of but off the edge of the first mirror; the light beam is prepared so that it expands as it goes to the third mirror. The third mirror refocuses the beam to a point on the first mirror. The beam is then reflected to and expanded at the second mirror. The second mirror refocuses the light beam to a new spot 17 on the first mirror. At this point, the light may either exit the cell if the spot is off the edge of the first mirror, or continue to traverse the cell. The beam may traverse the cell a predetermined number of times, depending on the locations of the centers of curvature of the second and third mirrors.

Figure 2:
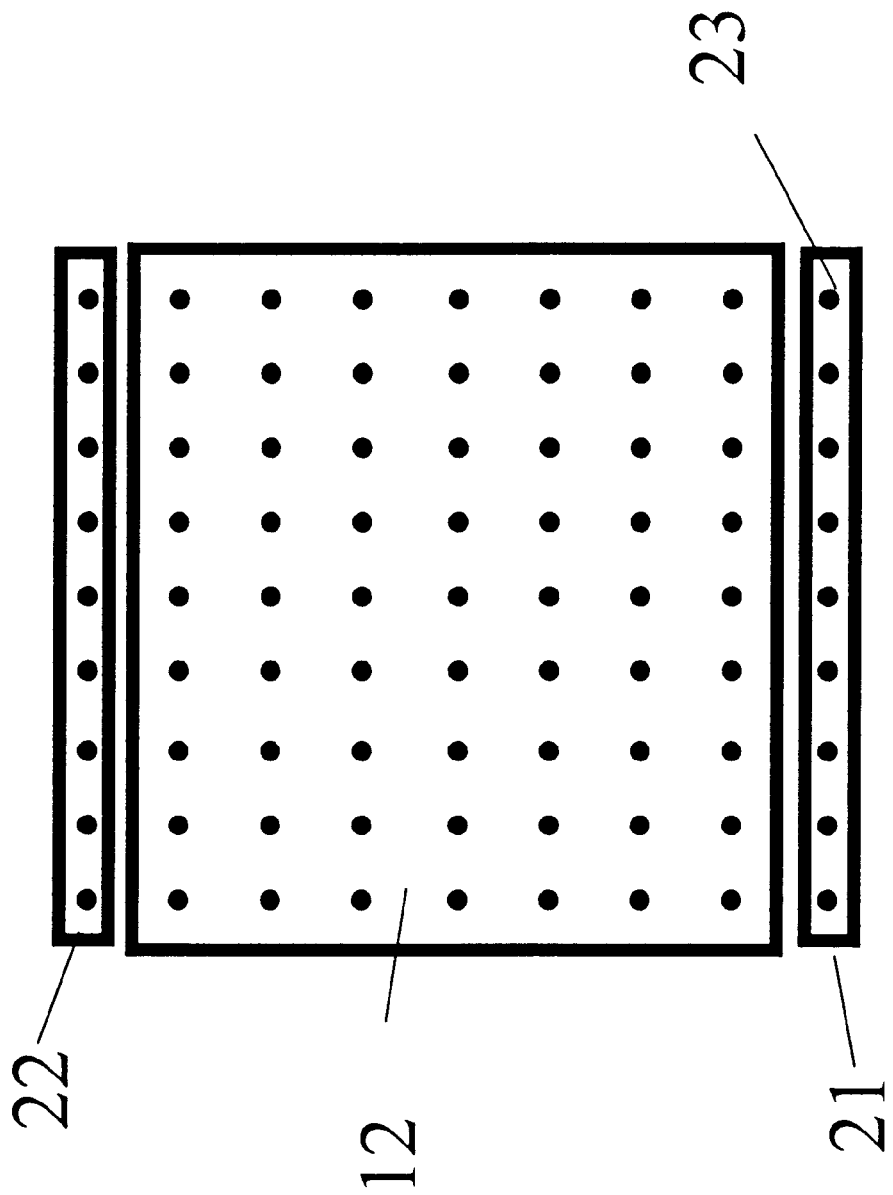
FIG. 2 is a front elevational view of the spatial light modulator, along with one embodiment of the input and output mirrors in accordance with the present invention.

The angle of the input beam may be controlled by an input turning mirror 21, as shown in FIG. 2. The angle of the output beam may similarly be controlled by an output turning mirror 22. Each bounce of a light beam is shown by a spot 23 on the turning mirrors or the first mirror 12. There are multiple light beams shown. A spatial light modulator or other appropriate device may alternatively replace the first mirror. A beam of light may be reflected off the input turning mirror into the White cell, and may traverse the cell until the beam is directed to the output turning mirror, at which point it may exit the cell.

Figure 3:
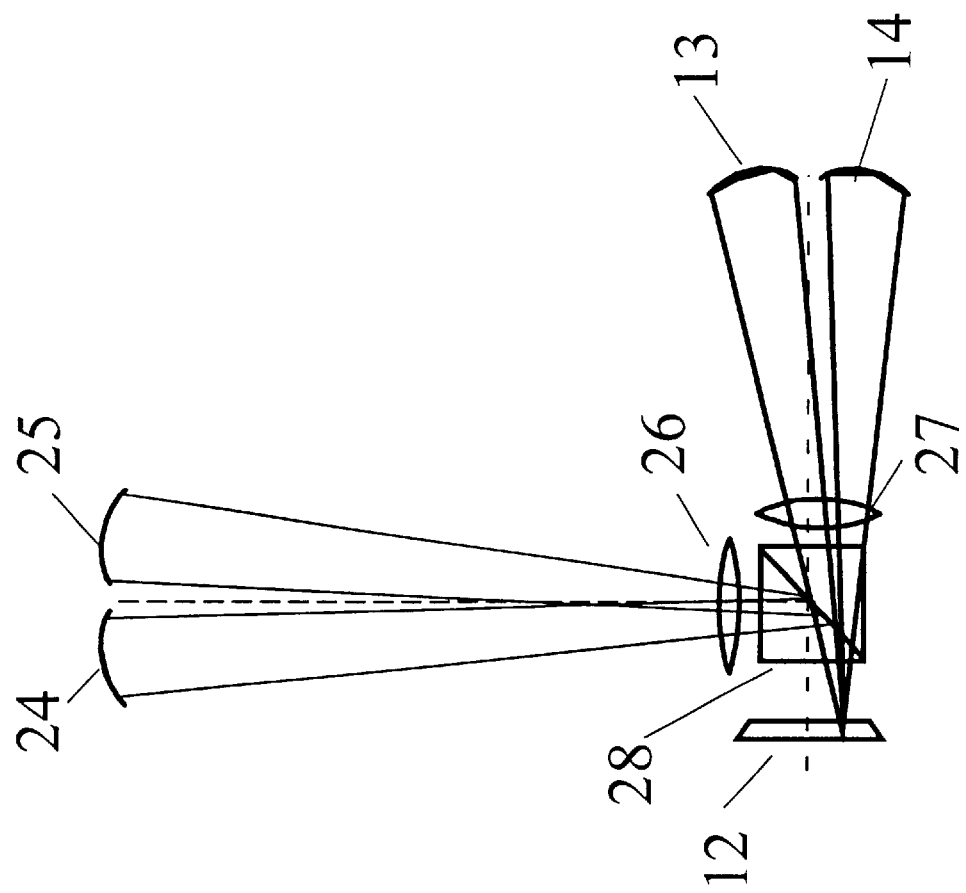
FIG. 3 is a top view of the dual-arm cell with a beam splitter in accordance with one embodiment of the present invention.

FIG. 3 shows a first modification to the White cell to adapt it to variable time delay applications. A first modification is to change. the first mirror 12 from a curved mirror to a flat one and to add a lens 27 of focal length such that the lens-mirror. combination is optically equivalent to the mirror it replaces. Next, the flat mirror may be replaced with a spatial light modulator. This particular spatial light modulator may be configured to rotate the direction of polarization of the reflected beam by ninety degrees at. any particular pixel that is activated. Then, a polarizing beam splitter 28 may be added, and the distances to the second 13 and third 14 mirrors may be adjusted to maintain imaging. The input light may be polarized in the plane of the paper. The beam splitter may reflect. light polarized in the plane perpendicular to the paper but transmit light polarized parallel to the plane of the paper.

A better photonic device may be implemented by next adding a fourth 24 and fifth 25 mirror, where these mirrors are identical but have a focal length different than that of the second and third mirrors. There now exist dual cells joined at the beam splitter. Since the single lens 27 can no longer satisfy the focusing conditions for both cells, a lens 26 of different focal length may be added to the other output side of the beam splitter. The focal lengths of the lenses are chosen to compensate for the new mirror locations.

Figure 4:
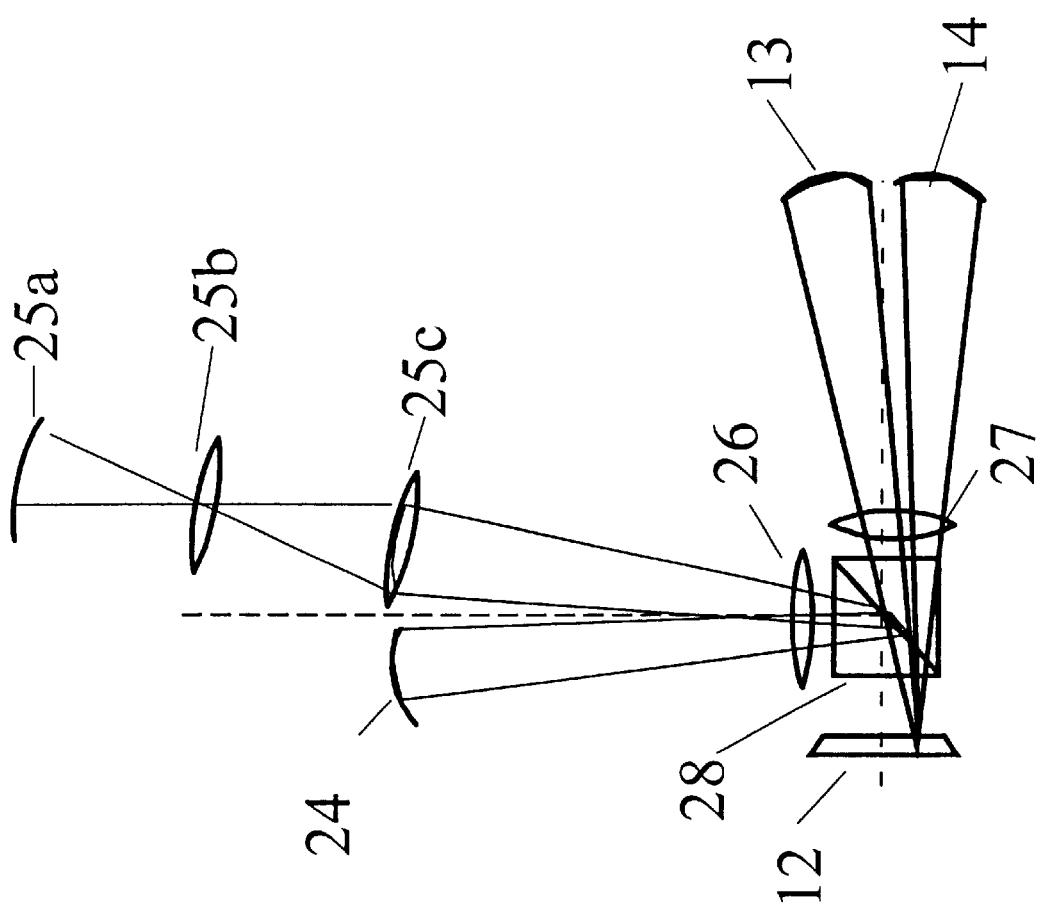
FIG. 4 is a top view of a quadratic cell, where the distances from the spatial light modulator to the White cell mirrors vary, in accordance with one embodiment of the present invention.

Yet a better photonic device may be obtained if the distances to the fourth and fifth mirrors from the beam splitter are different, as shown in FIG. 4. In this case the radii of curvature of the fourth and fifth mirrors will be different. An additional lens or lenses may be added between lens 26 and mirror 25a to maintain imaging.

Figure 5:
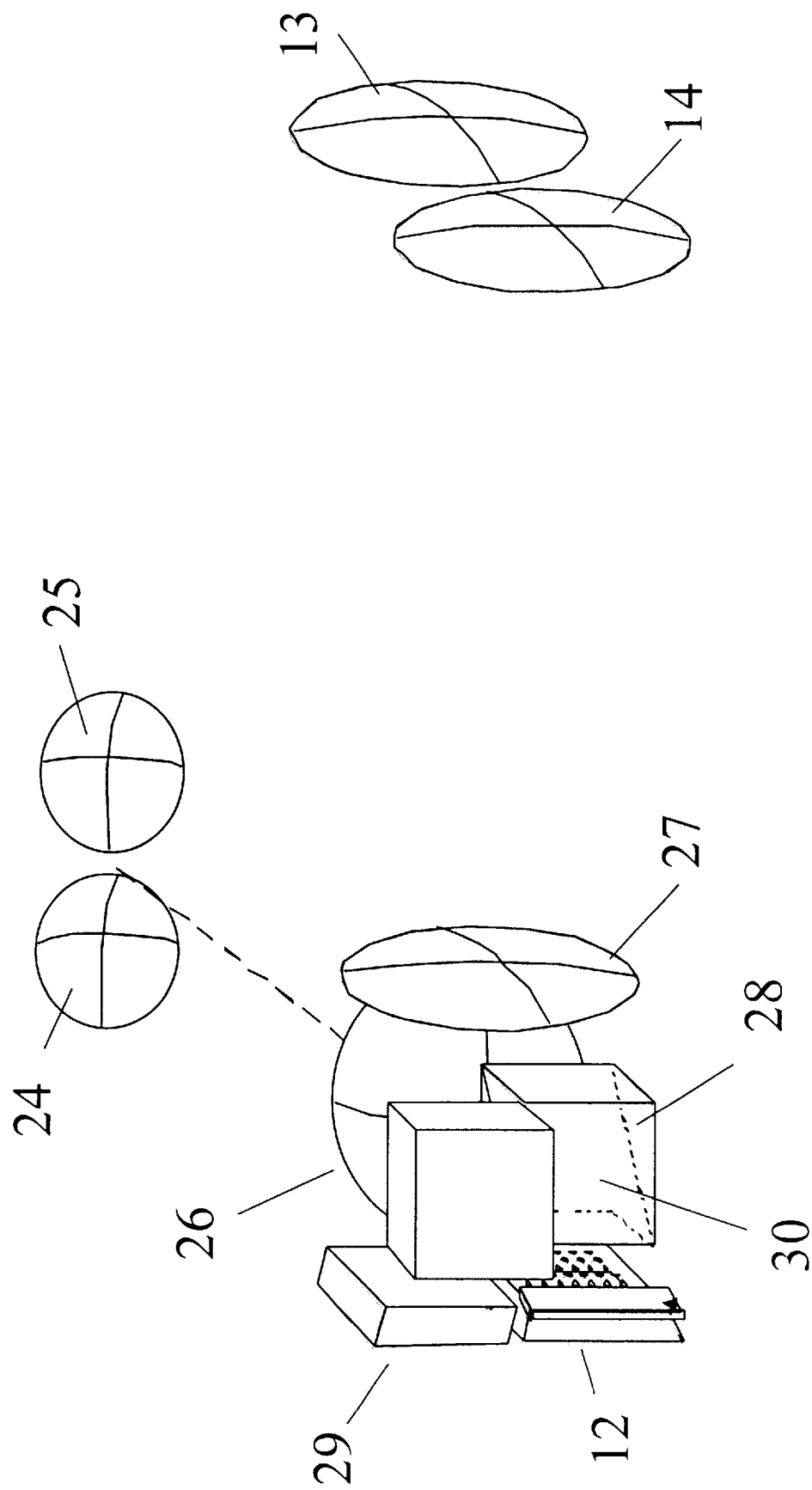
FIG. 5 is a perspective view of the dual arm cell with a set of glass blocks and auxiliary mirror in accordance with one embodiment of the present invention.
Figure 5A:
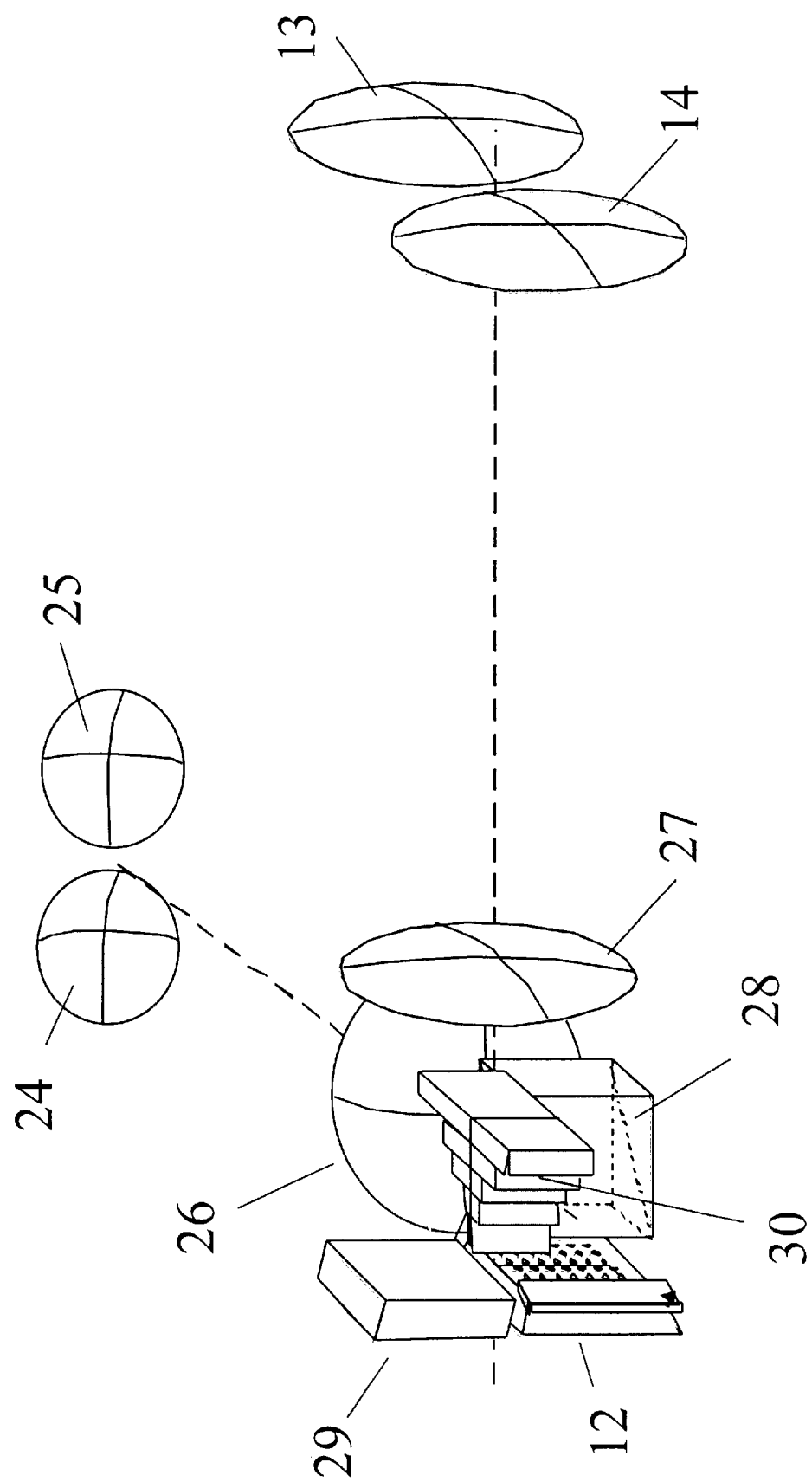
FIG. 5a is another perspective view of the dual arm cell in accordance with one embodiment of the present invention.

To improve the number of potential time delays, the design of the dual-armed unit of FIG. 3 may be further modified. This configuration is shown in FIG. 5. First, auxiliary mirror 29 may be added in the plane of the spatial light modulator 12. A second auxiliary mirror may be placed in the image plane of the spatial light modulator. Then, a time delay mechanism such as a set of glass blocks 30 may be substituted for this second auxiliary mirror, as shown in FIG. 5a. The blocks are reflective on the sides furthest from the lens 41. Alternatively, the glass blocks could be replaced by optical fibers or an array of fibers. The optical axis is between the spatial light modulator and the auxiliary mirror. The first lens 27 has been made larger to cover them. The thicknesses of the glass blocks may be chosen so that the additional time required for the beams to go through successive blocks increases as powers of two times the initial thickness. The operation is comparable to that of the dual cell with the plane of the spatial light modulator enlarged and additional time delays due to the addition of the glass blocks or equivalent transparent materials.

Figure 6:
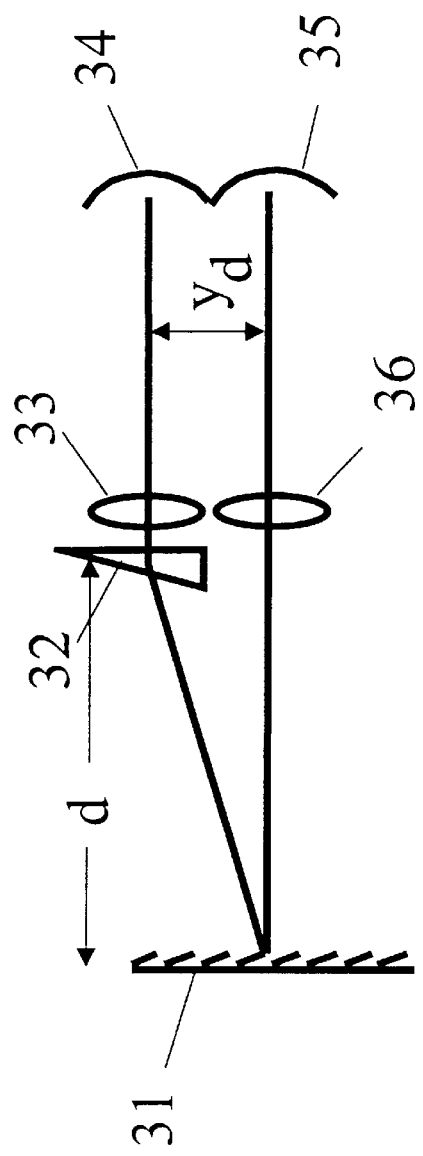
FIG. 6 is a diagram of a White cell using a deformable mirror device spatial light modulator and an appropriate prism in accordance with one embodiment of the present invention.
Figure 7:
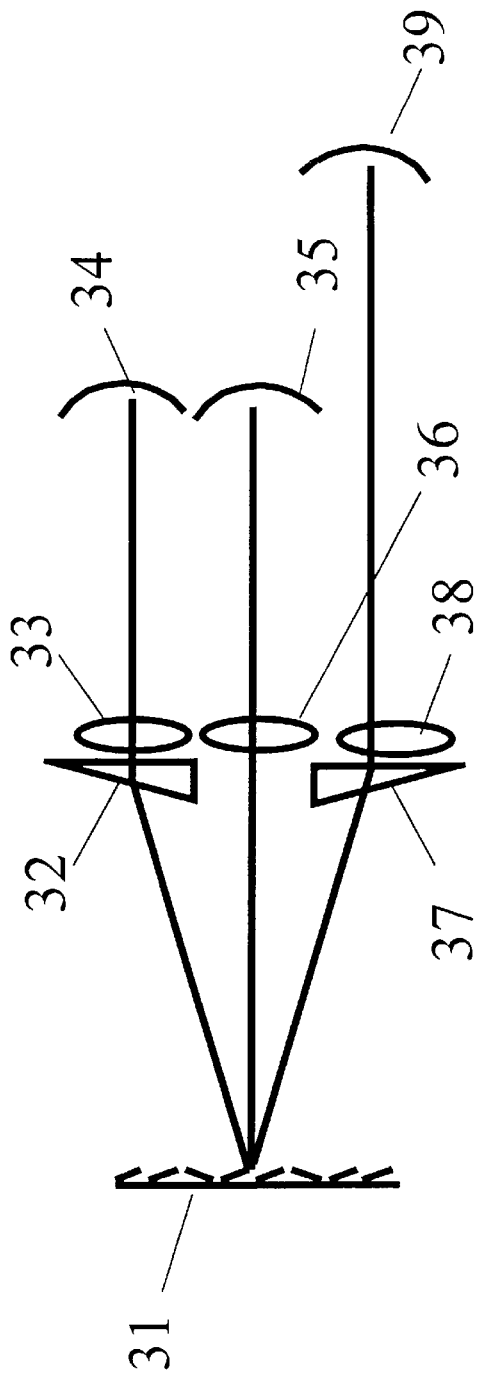
FIG. 7 is a diagram of a multiple arm version of the deformable mirror device configuration in accordance with one embodiment of the present invention.

If a deformable mirror device spatial light modulator 31 is used, a simple White cell can be constructed as shown in FIG. 6. A prism 32 may be used to direct the light beam through a focusing lens 33 onto the appropriate mirror 34 off the optical axis. FIG. 7 also shows that another prism 37 may be introduced to direct light from the deformable mirror device spatial light modulator 31 through a refocusing lens 38 onto the other off-axis mirror 39 in the dual-arm configuration.

Figure 8:
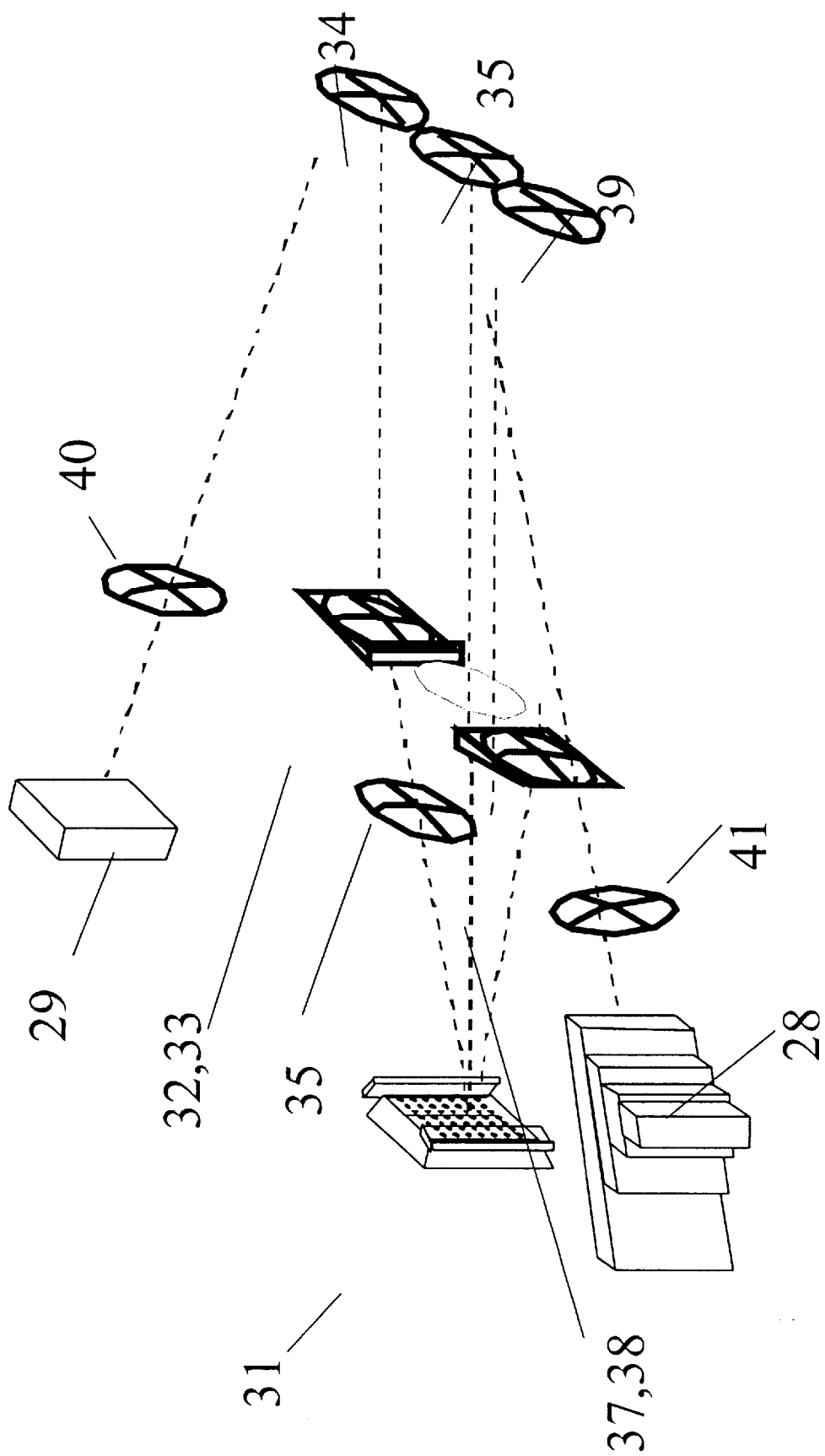
FIG. 8 is a perspective view of an alternative cell configuration in accordance with one embodiment of the present invention.

Another possible configuration of the dual arm cell is shown in FIG. 8. Here, the second and third mirrors of the first arm of the original device are replaced by the second 35 and third 39 mirrors of the new configuration. The fourth and fifth mirrors that comprised the second arm of the original device are then replaced by the second mirror 35 again, along with the first mirror 34 of the new configuration. Then, light beams may bounce from the second or third mirrors to the first or second mirrors, then back to the second or third mirrors, mimicking the operation of the original dual-arm cell. An additional lens 40 may be used to image the spatial light modulator onto an auxiliary mirror 29, and a lens 41 may be used to image the spatial light modulator onto a delay mechanism such as glass blocks 30.

A prism such as 32 and its adjacent lens such as 33 may be replaced with a single lens that is appropriately tilted or decentered or both.

Figure 9:
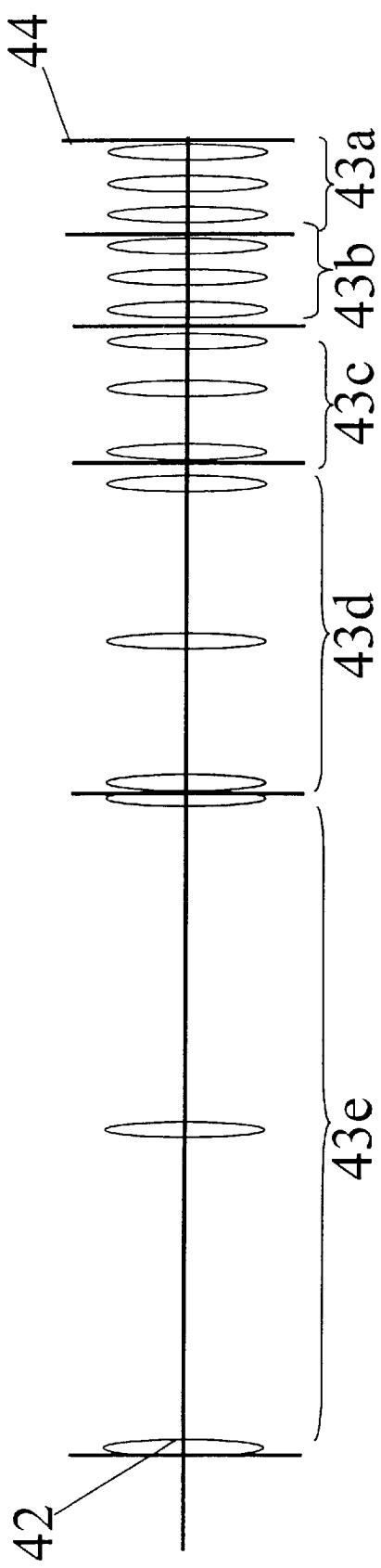
FIG. 9 is a side elevational view of a system of lens groups in accordance with one embodiment of the present invention.
Figure 10:
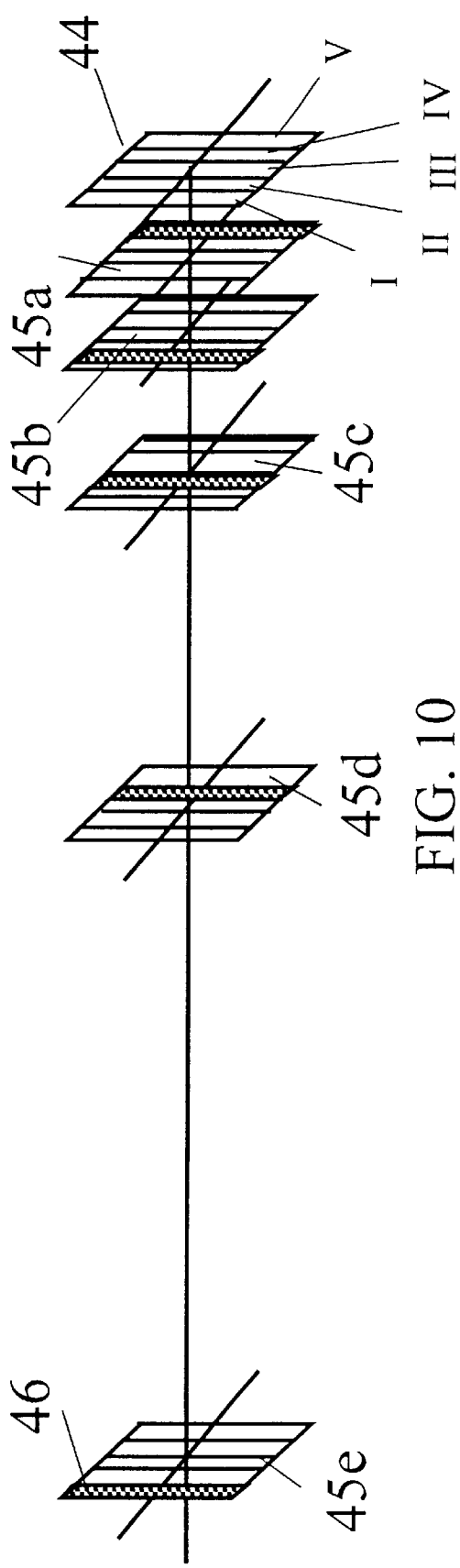
FIG. 10 is another side elevational view of the image planes in the optical transmission line in accordance with one embodiment of the present invention.

In order to obtain longer time delays, it is possible to introduce a lens waveguide in place of the glass blocks. FIG. 9 shows such a lens waveguide. Three lenses 42 form a lens group 43. The lens groups may then be placed along a common optical axis to form an optical transmission line or lens waveguide. The light comes into the optical transmission line from the right. The input plane 44 is coincident with an auxiliary mirror plane. At the left of each lens group is an additional plane conjugate to the auxiliary mirror plane. A transparent material may be placed at these conjugate planes, as shown in FIG. 10. Each sheet of transparent material 45 may have a reflective strip 46 on a portion of its surface. This permits light beams incident on different areas of the waveguide to propagate through different lengths of the optical transmission line.

Materials and Methods

Imaging Conditions. An analytical description of one arm of the White cell is presented. The configuration to be described is shown in FIG. 3. At the right of the figure, a White cell spherical mirror B 14 is shown below the axis and a White cell mirror C 13 above the axis. The center of curvature of White cell mirror B is a distance $\delta_1$ above the optical axis. The center of curvature of Mirror C is a distance $\delta_2$ below the optical axis. To the left of the White cell mirrors is lens f1 27 with focal length $f_1$. Adjacent to it is the polarizing prism 28 represented by a cube of glass of side d, and next to that is a flat mirror perpendicular to the optical axis representing the SLM. To present the analytical description of the imaging requirements, optical ray matrices are used. These matrices operate on a column vector $$\begin{pmatrix} y \\ np_y \\ 1 \end{pmatrix}$$

where y, n, and $p_y$ refer to the projection of a ray on the y-z plane. The vector element y represents the displacement of the ray from the optical (z) axis at some value of z. The element $p_y$ represents the slope of the ray at that point and n is the refractive index in the region. The third matrix element "1" is used in representing a tilted spherical mirror as will be shown later. A similar analysis could be used with y replaced by x and $p_y$ replaced by $p_x$ for the projection of the ray on the x-z plane. 3×3 ray matrices are used because they will be useful in representing the tilted spherical mirrors. Three ray matrices are used. The first is the matrix T(d, n), representing a translation through a material of refractive index n by a distance d in the axial direction.

$$T(d, n) = \begin{pmatrix} 1 & d/n & 0 \\ 0 & 1 & 0 \\ 0 & 0 & 1 \end{pmatrix}$$

The second is the matrix L(f) representing a thin lens of focal length $$L(f) = \begin{pmatrix} 1 & 0 & 0 \\ -1/f & 1 & 0 \\ 0 & 0 & 1 \end{pmatrix}$$

The thin lens matrix is identical with that of a spherical mirror of focal length f with its center of curvature on the axis.

Figure 11:
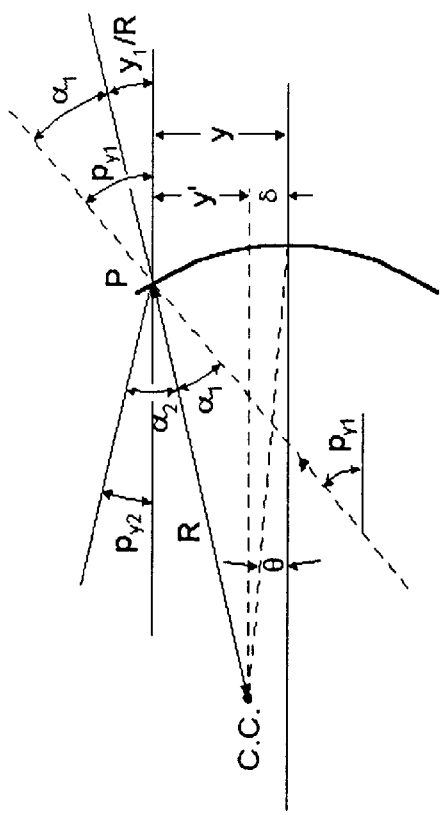
FIG. 11 is a ray diagram for a spherical mirror in accordance with one embodiment of the present invention.

A last matrix represents a spherical mirror tilted so that a line from the intersection of the mirror and the optical axis to the center of curvature, point CC, makes an angle $\theta$ with the optical axis. A ray comes from the lower left with slope $p_{y1}$ reflecting off the mirror at point P and leaving with slope $P_{y2}$. Line CCP is drawn from point P through the center of curvature. There are two lines parallel to the axis, one through the center of curvature and one through point P. Line CCP makes angle $\alpha_1$ with the incoming ray and angle $\alpha_2$ with the reflected ray, as shown in FIG. 11. The center of curvature is a distance $\delta$ above the optical axis, and point P is a distance y above the optical axis and a distance y' above point CC.

Then there are five equations. Since the angle of incidence equals the angle reflection, $\alpha_1 = \alpha_2$. For small angles $\alpha_1 = p_{y1} - (y'/R)$ and $\alpha_2 = P_{y2} + (y'/R)$. Also, $y = y' + \delta$ and $\delta = \theta R = 2\theta f$, where f is the focal length of the mirror. Combining these equations to eliminate $\alpha_1$, $\alpha_2$, y', and R, gives $p_{y2}-\theta=p_{y1}+\theta-y/f$, the equation relating $p_{y1}$, the ray slope before reflection off the spherical mirror with $p_{y2}$, the ray slope after reflection. This leads to the ray matrix $M(f\theta)$:

$$M(f, \theta) = \begin{pmatrix} 1 & 0 & 0 \\ -1/f & 1 & 2\theta \\ 0 & 0 & 1 \end{pmatrix}$$

To use these matrices in practice, one identifies the translations and thin lenses and mirrors encountered as a ray traverses an optical system and multiplies the associated matrices together to represent the effect of the optical system on the ray. Call the product matrix S. Then there results a matrix equation representing the ray slope-index products at the input and output $n_1 p_{y1}$ and $n_2 p_{y2}$ and the displacements of the ray from the axis at the input and output, $y_1$ and $y_2$.

$$\begin{pmatrix} y_2 \\ n_2 p_{y2} \\ 1 \end{pmatrix} = S \begin{pmatrix} y_1 \\ n_1 p_{y1} \\ 1 \end{pmatrix} \begin{pmatrix} A & B & G \\ C & D & H \\ I & J & K \end{pmatrix} \begin{pmatrix} y_1 \\ n_1 p_{y1} \\ 1 \end{pmatrix}$$

This represents three simultaneous equations. For example, the first such equation is $y_2=Ay_1+B\ n_1 p_{y1}+G$. This equation nicely relates the input and output ray positions. The requirement that there be imaging between the input and output planes is that matrix element B=0. That requirement allows solving for the desired distances or focal lengths.

To return to the optical system, there are four requirements for proper operation. The first requirement is that Mirror B be imaged onto Mirror C so that no light will be lost by rays starting from Mirror B and missing Mirror C. To establish this requirement the system matrix S(B, C) is calculated for rays traversing from Mirror B to Mirror C. It is $S_{(B,C)}=T(d, 1)L(f_1)T(2d_1, n_1)L(f_1)T(d, 1)$. Inserting d, $d_1$ and $f_1$ in the appropriate matrices and multiplying the matrices together yields $$S_{(B,C)} = \begin{pmatrix} \{(1-(d/f_1))(1-(2d_1/n_1 f_1))-(d/f_1)\} & 2\{(1-[d/f_1])(d+(d_1/n_1)(1-[d/f_1]))\} & 0 \\ -(2/f_1)(1-[d_1/n_1 f_1]) & (1/f_1)\{d+(2d_1/n_1)(1-[d/f_1])\}+(1-[d/f_1]) & 0 \\ 0 & 0 & 1 \end{pmatrix}$$

The requirement that Mirrors B and C be conjugates then is that matrix element B be zero: $2\{(1-[d/f_1])(d+(d_1/n_1)(1-[d/f_1]))\}=0$. This is used to give the desired focal length for lens $f_1$. There are two solutions: $f_1=d$ and $f_1=d/(1+[n_1 d/d_1])$. These solutions represent symmetric and anti-symmetric ray patterns about the SLM. In the first solution a point on Mirror B has an image at infinity which gives an image on Mirror C with a magnification of −1. In the second solution a point on Mirror B has an image on the SLM. This also gives an image on Mirror C with a magnification of +1. The first solution works very nicely for this situation. This puts Mirrors B and C in the focal plane of lens f1. The same analysis applies to Mirrors E 25 and F 24 and lens f2 26. Mirrors E and F are in the focal plane of lens f2.

The second requirement is that Mirrors E and F be images of each other.

Considering requirements three and four that a point on the SLM be imaged back onto itself through each cell, take f to be the focal length of mirror B. The system matrix for that case is given by $S=T(d_1,n_1)L(f_1)T(d,1)L(f\theta)T(d,1)L(f_1)T(d_1,n_1)$. Multiplying the appropriate matrices together and putting $f_1=d$ as required by the first imaging condition results in $$S = \begin{pmatrix} -1 & 2(d-[d_1/n_1])-(d^2/f) & 0 \\ 0 & -1 & 0 \\ 0 & 0 & 1 \end{pmatrix}$$

The imaging condition is then $B=0=2(d-[d_1/n_1])-(d^2/f)$, or $f=d/\{2(1-[d_1/n_1 d])\}$. This equation allows predicting the required focal length for the spherical mirrors.

Figure 12:
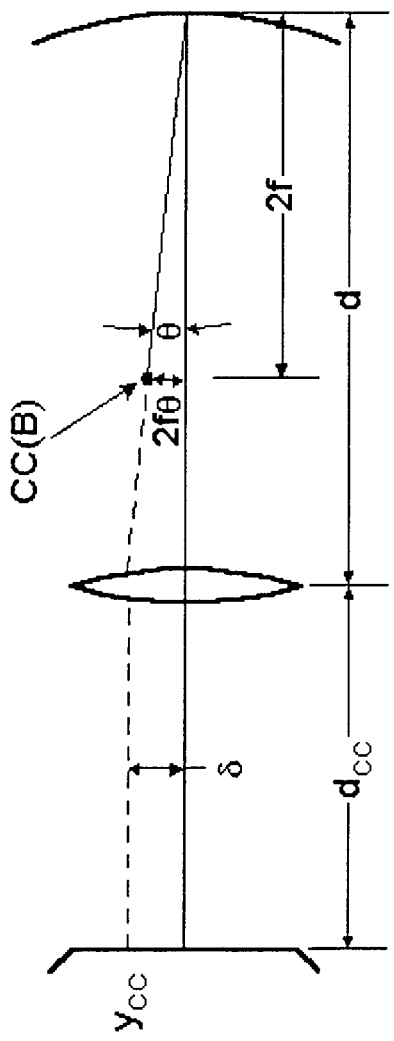
FIG. 12 is another ray diagram of a spherical mirror/lens system in accordance with one embodiment of the present invention.

The equation also has some interesting implications leading to physical meaning, as explained by FIG. 12. For the first one, consider the image of the center of curvature of Mirror B through lens f1. The radius of curvature of Mirror B is 2f and the distance of its center of curvature from lens f1 is d−2f. Then the distance of the image from the center of curvature, call it $d_{cc}$, is given by $1/d_{cc}+1/(d-2f)=1/f_1$. Eliminating f in these equations and simplifying results in $d_{cc}=d_1/n_1$. That is, the image of the center of curvature of Mirror B lies on the SLM surface. The image of the center of curvature of mirror B on the SLM can be called the center of curvature point.

To find out where on the SLM surface the center of curvature point is located, look to the magnification. The y value of the image of the center of curvature point, call it $y_{cci}$ is given by the y value of the center of curvature itself, $Y_{cco}$, times the magnification, or $y_{cc}=y_{cco}\times$magnification$=2f\theta\times$(−image distance/$n_1$)/(object distance)$=2f\theta\times\{-d_1/(n_1[d-2f])\}$. Using a previous equation for 2f and simplifying gives $y_{cc}=\theta d$, which has a very nice interpretation. If a line is drawn from the intersection of the optical axis with Mirror B through the center of curvature of Mirror B, then the intersection of that line, extended if necessary, with lens f1 is a distance $\theta d$ from the axis. The projection of that intersection onto the SLM gives the center of curvature point.

There is a further interpretation in terms of point sources on the SLM that are imaged back onto the SLM. Writing the first linear equation for the system matrix gives $y_2=-y_1+2\theta d$. Here, $y_1$ is the location of a point source on the SLM and $y_2$ is the location of its image after the light from the source has passed through lens f1, been reflected off Mirror B and passed back through lens f1. Defining $\delta=\theta d$ and rewriting this equation gives $(y_2-\delta)=-(y_1-\delta)$. This is interpreted in terms of a distance $\delta$. The interpretation is that the image formed by Mirror B of a point on the SLM is as far above the center of curvature image as the object is below the center of curvature point.

The behavior in the x direction is identical with the exception that Mirror B is tipped ony in the y direction so that $\theta=0$. The x equation equivalent is $x_2=-x_1$. Since the center of curvature point is on the y axis, an image of a point source from the center of curvature is as far from the source point as the object was, but on the opposite side in both the x and y directions. To find the image of a point source on the SLM, one can merely reflect about the center of curvature point.

Increased Delay Time Due to Glass Blocks. Here is presented an analysis of a dual cell with auxiliary mirrors with glass blocks in front of Auxiliary Mirror I. The situation analyzed is shown in FIG. 5a. The SLM 12 is shown, along with a polarizing beam splitter 28, lens f2 27, the White cell mirrors (13, 14, 24, 25) and Auxiliary Mirror I 29 and a group of glass blocks 30. The size of the polarizing beamsplitter is $d_1$ and its refractive index is $n_1$. The focal length of cell lens f2 is $f_2$ and is separated from the White cell mirror by a distance $d_{EF}$. The distance, $d_2$, between lens f1 and Auxiliary Mirror I is divided into two regions, one of thickness $d''_2$ filled with air or other material, and the other of thickness $d'_2$ filled with material of refractive index $n_2$.

Figure 13:
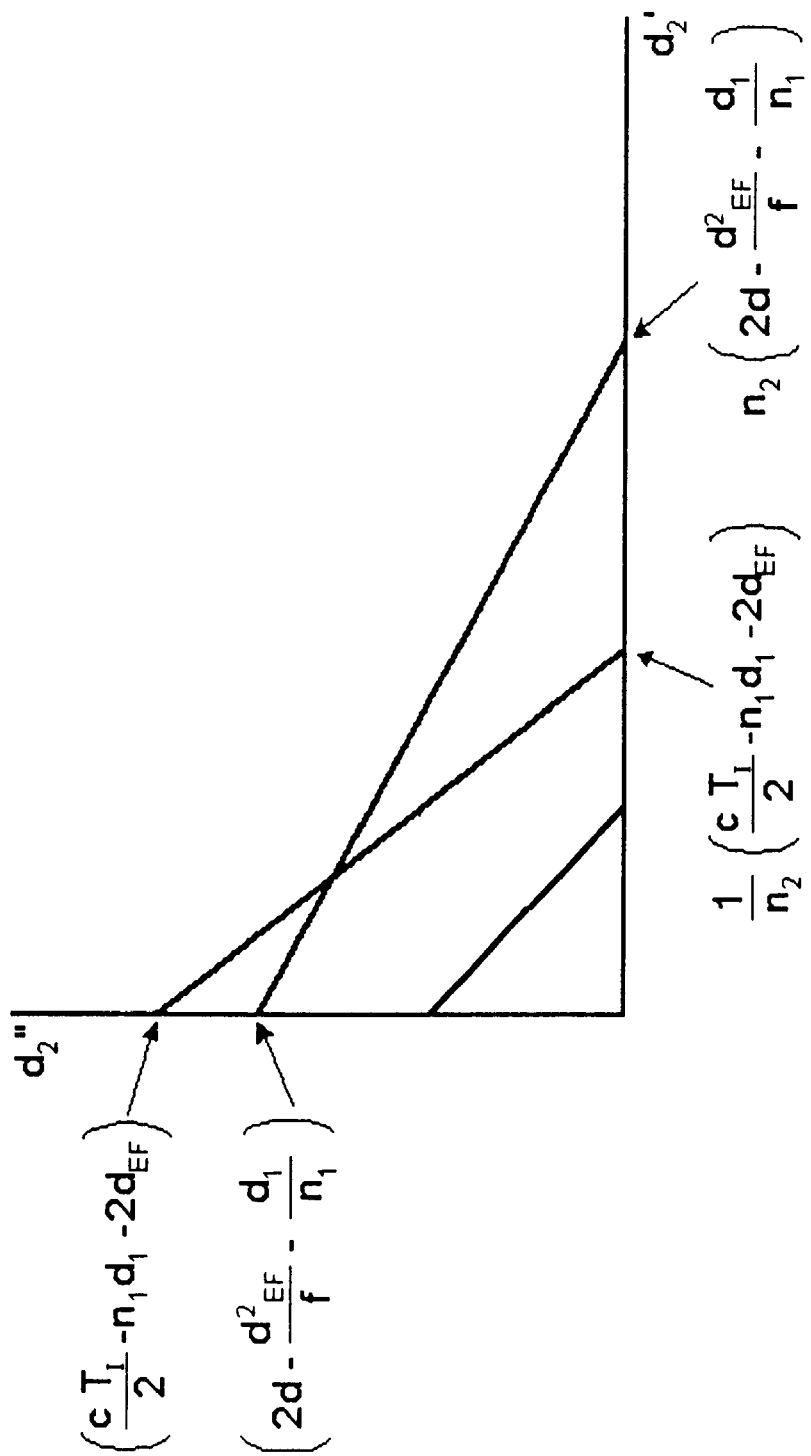
FIG. 13 is a plot of path distances in accordance with one embodiment of the present invention.

It is chosen that $f_2=d_{EF}$. The requirement that the SLM be imaged onto Auxiliary Mirror I can be easily calculated. The result is $d'_2/n_2+d''_2=2d-d^2_{EF}/f-d_1/n_1$. It can be noted that $d''_2=0$ and $d_2=d'_2=d_1$, $d_{EF}=D$, and $n_2=n_1$ the equation reduces nicely, giving the desired combinations of $d'_2$ and $d''_2$ that will give imaging. The distances $d'_2$ and $d''_2$ must further be reduced to the transit time. The transit time, $T_1$, for one pass from the SLM to Auxiliary Mirror I and back is given by $cT_1/2=n_1d_1+2d+n'_2d'_2+d''_2$. This can be rewritten to give a second equation involving $d'_2$ and $d''_2$, $n_2d'_2+d''_2=(cT_1/2)-n_1d_1-2d_{EF}$. From these equations there is an allowed range for the variables $d'_2$ and $d''_2$ and $T_1$. A plot of $d''_2$ versus $d'_2$ (shown in FIG. 13) can be created showing the region of interest, where $d'_2$ and $d''_2$ are positive. It could then be noted that the slope of the first equation is $-1/n_2$ and the intercepts that depend on $d_2$, f, $d_1$, and $n_1$ are also fixed. The slope of the second equation is $-n_2$ (constant) and the intercepts depend on $T_1$, which is variable. The line shifts to the right as $T_1$ increases. The minimum value of $T_1$ occurs when the two lines intersect on the vertical axis, i.e. $T_{1,min}=(2/c)\{n_1d_1+2d_{EF}+(2d_{EF}-[d^2_{EF}/f]-[d_1/n_1])\}$. There is a minimum value for $d_2$. The line representing the distance $d_2$, $d'_2+d''_2=d_2$, can be plotted, from the lens f1 to the Auxiliary Mirror I. This line also moves to the right as $d_2$ increases. The smallest value of $d_2$ occurs when the lines intersect on the vertical axis. That gives the minimum distance from the lens f1 to Auxiliary Mirror I, $d_{2,min}=2d_{EF}-(d^2_{EF}/f)-(d_1/n_1)$.

Combining equations to solve for the thickness of the glass and of the air, these expressions are most easily written if $2d_{EF}-(d^2_{EF}/2f)-(d_1/n_1)$ is replaced in terms of $d_{2,min}$ and if $n_1d_1+2d$ is replaced in terms of $T_{1,min}$:

$$d'_2 = \{n_2/(n_2^2-1)\}\{[(cT_l/2)-n_1d_1-2d] -$$
$$[2d_{EF}-(d^2_{EF}/f)-(d_1/n_1)]\}$$
$$= \{n_2/(n_2^2-1)\}(c/2)(T_l - T_{l,min})$$
$$d''_2 = \{-n_2/(n_2^2-1)\}(1/n_2)[(cT_l/2)-n_1d_1-2d] -$$
$$n_2[2d_{EF}-(d^2_{EF}/f)-(d_1/n_1)]\}$$
$$= d_{2,min} - \{1/(n_2^2-1)\}(c/2)(T_l - T_{l,min})$$

This gives the incremental thickness of the glass, $d'_2$, that will give an incremental time increase, $T_1-T_{1,min}$. An expression for the full distance $d_2$, from lens f1 to Auxiliary Mirror I can be obtained by combining these equations: $d_2=d_{2,min}+\{1/(n_2+1)\}(c/2)(T_1-T_{1,min})$. This starts at $d_{2,min}$ as expected and increases with $(T_1-T_{1,min})$. Distance $d_2$ can also divided into $d'_2$ and $d''_2$. As the time delay increases the position of the reflecting surface moves back, the glass becomes thicker and the air layer thinner. For that refractive index, the air layer is decreasing twice as fast A) as the auxiliary mirror is moving back. The size of various parameters can also be estimated for a typical situation. One can choose $d=f1=40$ cm, $f=50$ cm, $d_1=3.81$ cm(1.5 in), and $n_1=1.5$. $d_{min}=61.46$ cm, $T_{min}=9.58$ nanoseconds, and $\Delta d'_2/\Delta T_1=1.8\times10^{11}$ mm/sec. Thus, if a delay of $10^{-12}$ seconds is desired, a block 0.18 mm thick can be used.

Figure 14B:
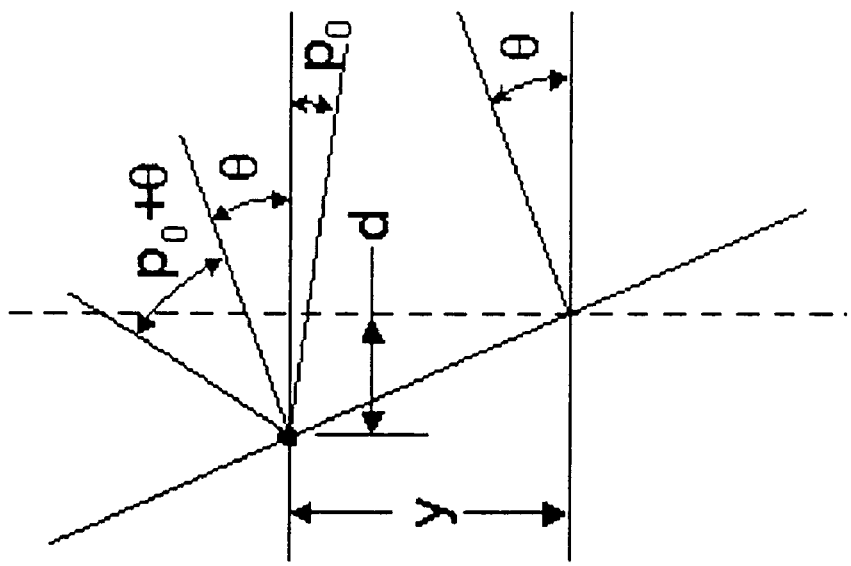
FIG. 14b is another ray diagram in accordance with one embodiment of the present invention.
Figure 14A:
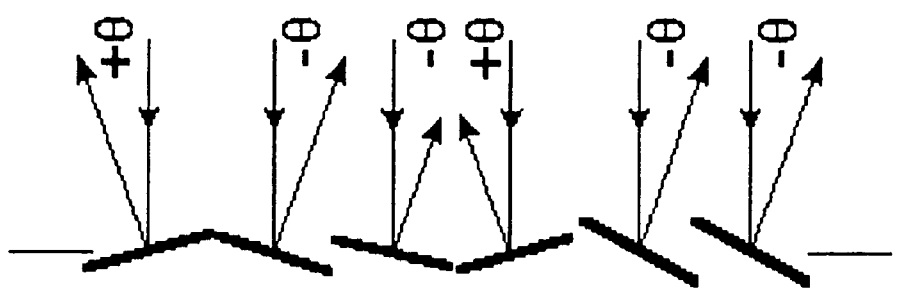
FIG. 14a is a ray diagram of a deformable mirror device in accordance with one embodiment of the present invention.

Deformable Mirror Device SLM. To derive a ray matrix for a particular situation two equations are needed, one showing how the distance of a ray from the axis changes as the ray moves through the object, and the other showing how the ray slope changes. Some pixel-mirrors of the DMD are oriented with their normals at $+\theta$ and some at $-\theta$, as shown in FIG. 14a, where for one device $\theta=10°$. The surface of the DMD may be defined as a vertical line (y direction) intersecting the center of each pixel so that part of the pixel is behind the surface and part is in front of it. A ray can enter from the right with an angle $p_o$, as shown in FIG. 14b, and intersects the pixel at a distance y above the center of the pixel and is reflected off the pixel. At the point the ray intersects the pixel it is a distance $-y\tan\theta$ behind the surface. In going from the surface to the pixel, the height of the ray has increased a distance $d\tan p_o$,=$y\tan\theta\tan p_o$. After reflection from the pixel the ray again passes through the surface. In doing so the height has further increased a height $d\tan(p_o+2\theta)=y\tan\theta\tan(p_o+2\theta)$. The height has changed by a total distance $\Delta y=y\tan\theta[\tan(p_o)+\tan(p_o+2\theta)]$.

The ray matrices deal with paraxial rays so that $p_o<<\pi$, and $\theta=10°<<180°$, also a small angle. Putting the tangent of the angle equal to the angle, the increase in height $\Delta y=2y\theta(\theta+p_o)$. The net result of all these steps is that the increase in height is proportional to the product of small angles and can be neglected. Thus the first matrix ray equation relates the input y value, $y_o$, with the output y value, $y_1$, as $y_1=y_o$. The second equation is the one for the slopes. Using the law of reflection, the incident slope, $p_o$, and the reflected slope, $p_2$, are related as $p_1-\theta=p_o+\theta$, or $p_1+p_o+\theta$. Combining these equations into a 3x3 ray matrix yields the ray matrix for the DMD:

$$\begin{pmatrix} y_1 \\ p_1 \\ 1 \end{pmatrix} = \begin{pmatrix} 1 & 0 & 0 \\ 0 & 1 & 2\theta \\ 0 & 0 & 1 \end{pmatrix} \begin{pmatrix} y_o \\ p_o \\ 1 \end{pmatrix}$$

There is an addendum that can be mentioned, where the discussion could also apply to reflection off a tipped plane mirror if extending the edge of the pixel-mirror. Thus, the matrix equation also applies to a tipped plane mirror if the tip angle is small. If the tip angle is not a small angle, however, then the approximation does not hold and there will be an increase in distance from the axis.

Figure 15:
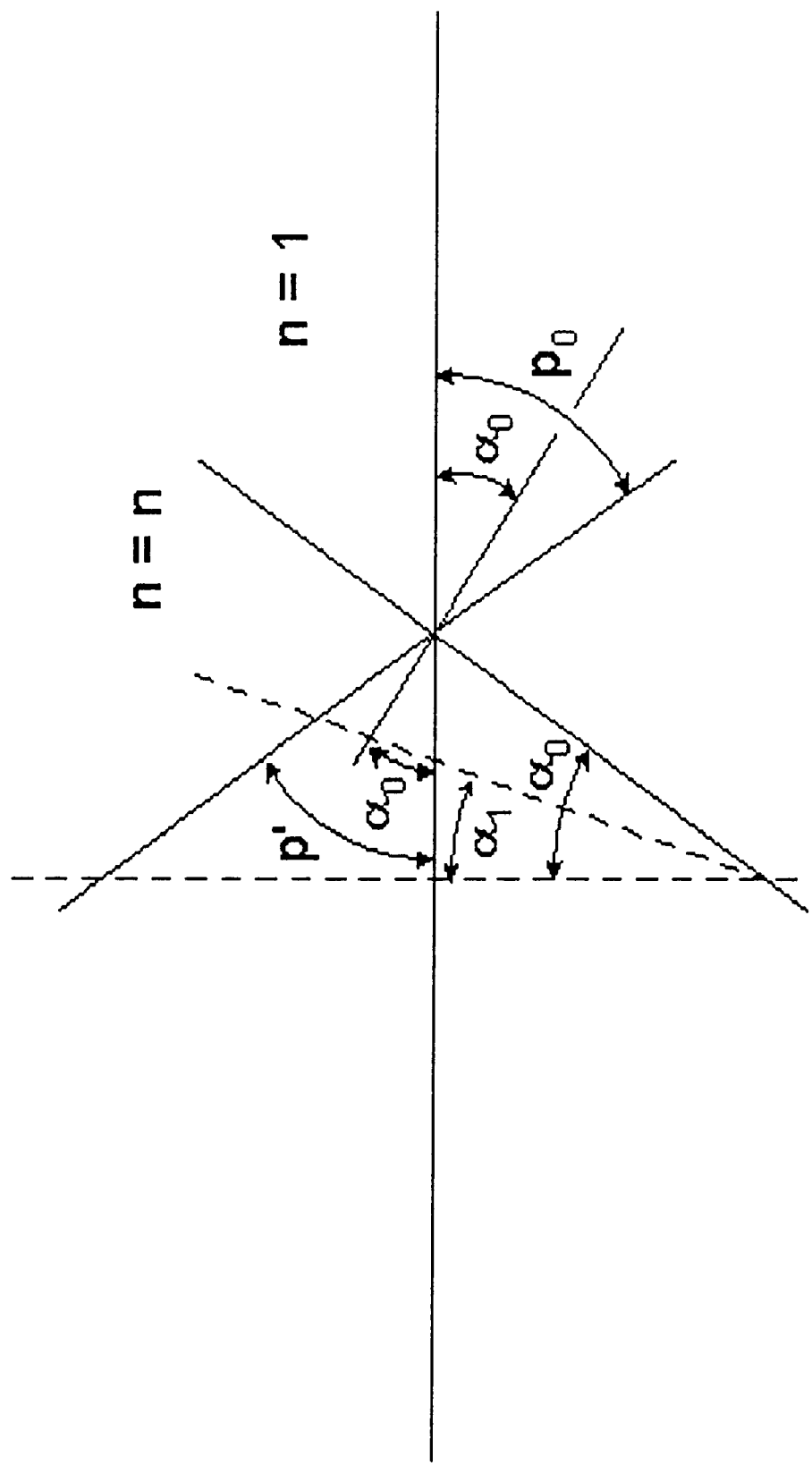
FIG. 15 is a ray diagram for a small angle prism in accordance with one embodiment of the present invention.

Next, a prism with a small angle is considered, as shown in FIG. 15. A prism with its apex pointing down can be considered. The refractive index of the prism material is n. The two large sides make small angles $\alpha_o$ and $\alpha_1$, with the vertical. A ray with slope $p_o$ and height $y_o$ can come in from the right, be refracted at the interfaces, and leave. Since the angles between the surfaces and the vertical are small, arguments like those used previously for the mirror can be used to show that the vertical displacement in crossing the prism can be neglected. The first matrix equation is then $y_1=y_o$. Snell's law can be used to derive the equation for the change of it slope. The entering ray has a slope $p_o$. The slope of the ray exiting the surface is p'. The angle between the ray entering the surface and the normal is $p_o-\alpha_0$. Similarly, the angle between the ray exiting the surface and the normal is p'-$\alpha$. Snell's law is then $\sin(p_o-\alpha_o)=n\sin(p'-\alpha_o)$, or using the small angle restriction, $np'=p_o+2(n-1)\alpha_o$. A comparable equation can be written for the ray as it exits the left-hand surface: $p_2=np'+(1-n)\alpha_1$.

Eliminating p' and defining the prism angle, $\alpha=\alpha_o-\alpha_1$, we have the equation for the change of slope by the prism, $p_2=p_1+(n-1)\alpha$. The ray matrix for the small angle prism is then:

$$\begin{pmatrix} y_2 \\ p_2 \\ 1 \end{pmatrix} = \begin{pmatrix} 1 & 0 & 0 \\ 0 & 1 & (n-1)\alpha \\ 0 & 0 & 1 \end{pmatrix} \begin{pmatrix} y_2 \\ p_2 \\ 1 \end{pmatrix}$$

Discussion

A dual White cell is shown in FIG. 3 connected by a polarizing prism beamsplitter. The mirror in the optical spatial light modulator 12 and spherical mirrors B 13 and C 14, combined with lens f1 27, constitute one White cell, hereafter referred to as Cell I. The mirror in the SLM and spherical Mirrors E 24 and F 25, combined with lens f2 26, constitute a second White cell called Cell II. The distances between the SLM and Mirrors B and C are the same, and the distances for light reflected off the polarizing beamsplitter going to Mirrors E and F are the same. The distance from the SLM to Mirrors E and F is greater than the distance from the SLM to Mirrors B and C. In operation, a light beam bounces from the SLM to one of Mirrors B, C, E and F and back again on each traverse of the cell.

The polarizing beamsplitter and the SLM determine which cell the beam goes to on each pass. The polarizing beam splitter transmits light of one polarization, say the plane of the figure, and reflects light of the polarization perpendicular to the plane of the figure. If the light starts out going to Mirror B with polarization in the plane of the figure and the SLM does not change the polarization, it is then reflected back and forth between the SLM and Mirrors B and C. Conversely, if the light starts towards Mirror E with polarization perpendicular to the plane of the figure and the SLM does not change the polarization, it will continue to reflect between the SLM and Mirrors E and F. The path of a beam can be changed from one cell to the other by using the SLM to rotate the plane of polarization as the beam bounces off the SLM.

The present disclosure discusses a set five possible imaging conditions. First, the focal length of lens f1 is chosen to image Mirror B onto Mirror C and vice versa. Second, similar to the first condition, the focal length of lens f2 is chosen to image Mirror E onto Mirror F and vice versa. This requirement may be met by placing Mirrors B and C in the right hand focal plane of lens f1 and by placing Mirrors E and F in the focal plane of lens f2. The third condition is that Mirror B should be imaged onto Mirror F, and Mirror C should be imaged onto Mirror E. The requirement that Mirrors B and C be in the focal plane of lens f1 together with the requirement that Mirrors E and F be in the focal plane of lens f2 also satisfies this condition.

The last two imaging conditions are also comparable. The fourth condition is that the focal lengths of Mirrors B and C are chosen so that, in conjunction with lens f1, Mirrors B and C image a small spot of light on the SLM back onto another small spot on the SLM. The last condition is that the focal lengths of Mirrors E and F are chosen so that, in conjunction with lens f2, a small spot of light on the SLM is again imaged back onto the SLM.

In operation, a point of light starts on a small mirror next to the SLM called a turning mirror. The light is directed towards Mirror B. Suppose the light is polarized in the plane of the figure so that it is not reflected off the polarizing beam splitter. Mirror B images the spot light onto the SLM. In one scenario, the light is reflected off the SLM and imaged by lens f1 onto Mirror C, which images it to a different spot on the SLM. It then goes to mirror B, which again images it onto the SLM. The light bouncing back and forth forms a sequence of spots on the SLM.

If the polarization is changed by the SLM to be perpendicular to the plane of the figure, the light bounces in a similar fashion back and forth between Mirrors E and F and the SLM. The plane of polarization of the light can be changed at any bounce off the SLM so that any combination of paths in cells one and two can be chosen. The quantity of interest, the transit time through the cell, is the number of bounces off Mirrors B and C times the transit time from the SLM to Mirror B and back, plus the number of bounces off Mirrors E and F times the transit time from the SLM to Mirror E.

Considering the exact locations of the spots of light on the SLM, there are various configurations depending on the locations of the centers of curvature of Mirrors B, C, E and F, and also depending on the spot size relative to the size of the SLM. The centers of curvature of Mirrors E and F are superimposed on those of Mirrors B and C so that the spots from cell E-F are also coincident with those from cell B-C. Reference will only be made to the centers of curvature of Mirrors B and C for simplicity.

FIG. 2 is a view of the SLM looking from lens f1, showing the most traditional spot configuration. The SLM is assumed to have a square shape. Also shown are two long thin mirrors, the input and output turning mirrors respectively below and above the SLM. For this case, the turning mirrors are centered at distances of $\pm 2m\delta$ where m is an integer related to the number of times the light is re-imaged onto the SLM and the SLM is taken to have dimension $2(2m-1)\delta$ on a side and $\delta$ is the distance below and above the optical axis, respectively, of the projections of the centers of curvature of Mirrors B and C.

Figure 16C:
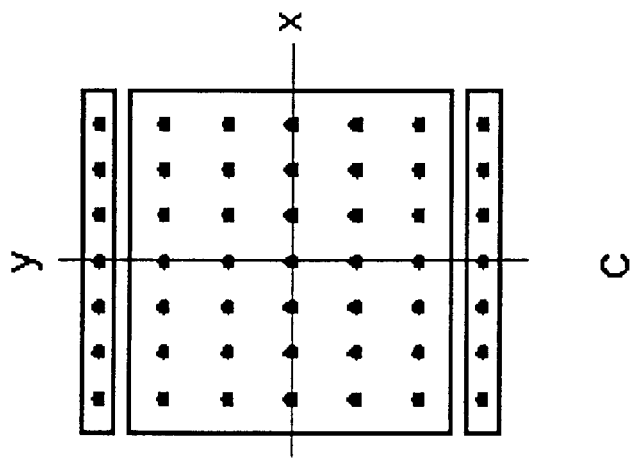
FIG. 16c is another diagram showing spot location on a deformable mirror device in accordance with one embodiment of the present invention.
Figure 16B:
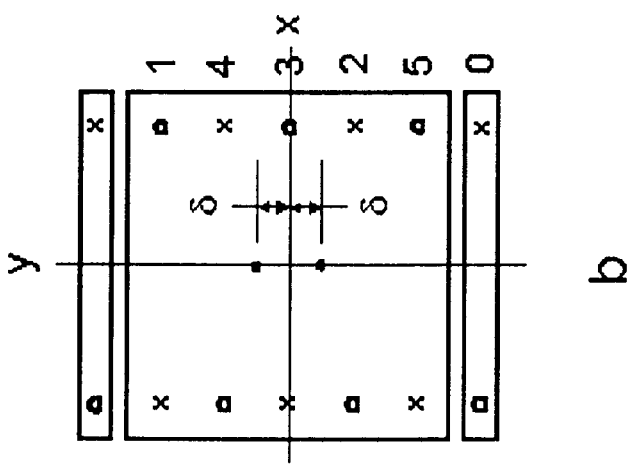
FIG. 16b is another diagram showing spot location on a deformable mirror device in accordance with one embodiment of the present invention.
Figure 16A:
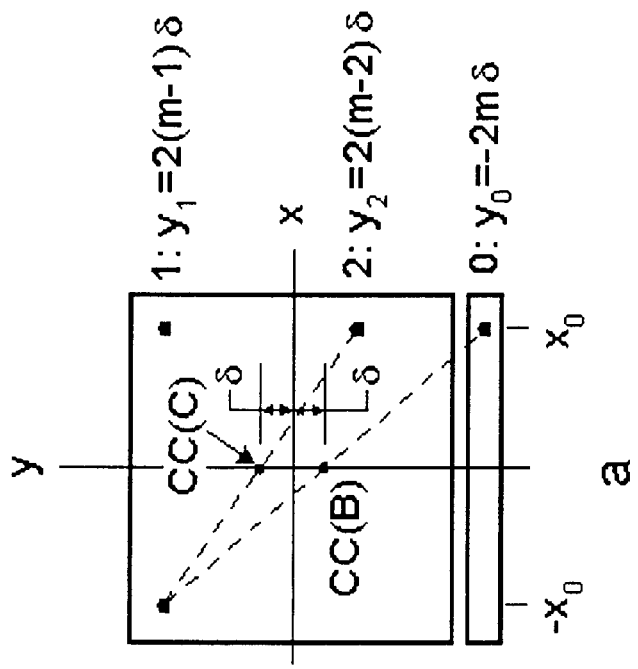
FIG. 16a is a diagram showing spot location on a deformable mirror device in accordance with one embodiment of the present invention.

Imagine a point of light on the right end of the input turning mirror, as shown in FIG. 16a, conditioned, as mentioned previously, to be traveling toward Mirror B. That spot is imaged to a new point on the SLM located opposite the center of curvature of Mirror B and an equal distance from the center of curvature. The position of the input spot on the turning mirror is $(x_o, y_o)$, where $y_o=-2m\delta$. The point image is at a location opposite the center of curvature of Mirror B. To find that location the sign of the coordinates is reversed and $2\delta$ is subtracted because the center of curvature of Mirror B is below the axis. If the light were being imaged by Mirror C, the sign of the coordinates would be reversed and $2\delta$ added. The result is $$(x_1, y_1)=(-x_o, -y_o-2\delta)=(-x_o, +2\delta(m-1)).$$

The light is then reflected back and re-imaged by Mirror C. The point image is opposite the center of curvature of Mirror C and an equal distance from it. The location is then at $(x_2, y_2)=(-x_o, -y_o, +4\delta) =(x_o,-2\delta(m-2))$. As the process continues, the light alternatively bounces off Mirrors B and C and is re-imaged. Locations of successive spots are designated as $(x_n, x_n)$ at the n-th re-imaging. These spot locations are given by $$(x_n, x_n)=((-1)^n x_o,(-1)^n(y_o-2n\delta))=((-1)^n x_o,(-1)^n 2(m-n)\delta).$$

Imagine a set of points for m=3, as shown in FIG. 16b. The point images can be indicated with "x"'s. The images form two vertical lines at $\pm x_o$. The horizontal coordinate of the points alternates to the right and left of center. As the image number n increases, the spots also alternate above and below the axis first moving successively towards the axis for n=1,2, and 3, and then away from the axis for n=4, 5, and 6. The process ends when n=2m=6 and the imaged spot winds up on the output turning mirror at the top. There are 2m-1=5 point images on the SLM.

There may be gaps between "x" spots in the columns on both sides. These can be filled by placing a second input spot at $(-x_o, y_o)$. More spots can be added on the input turning mirror, as shown in FIG. 16*c*, at different values of $x_o$. A complete line of spots then results on the input turning mirror, the spots being paired at different values of $\pm x_o$. Columns of spots can fill the area of the SLM.

Instead of a specific situation where the centers of curvature of mirrors B and C are equidistant from the optical axis, a more general situation can be discussed. There, the centers of curvature of the mirrors are shown on the y-axis. The center of curvature of Mirror B is at location $y_B$. The center of curvature of Mirror C is a distance $2\delta$ above it. The input spot is at location $x_o$, $y_o$, The expression for the location of spot n is $(x_n, y_n)=((-1)^n x_o, (y_B+\delta)+(-1)^n(y_o+2\delta n))$, where $y_B+\delta$ is the location of the point midway between the two centers of curvature. The equation still gives two columns of spots parallel to the line between the centers of curvature, the y-axis. The spots alternate from one column to the other as n increases. In general, a distance $4\delta$ separates the spots in a given column. The vertical positions of the spots in one column are, however, not identical with those in the other column. They depend on the y value of the location of the input spot. The equation reduces to the previous equation when $y_B=-\delta$. Two special cases of present themselves. For simplicity, the origin is taken midway between the centers of curvature so that $y_B+\delta=0$. In the first case $y_o$ is an even integer times $\delta$, or $y_o=n_e\delta(n_e$ even). This is the situation for n=6. Then the y values of the spots in one column are midway between the y values of the spots in the other column. The input spot is on the bottom turning mirror and the output spot is on the top turning mirror. There are m−1 reflections off the SLM.

Figure 17:
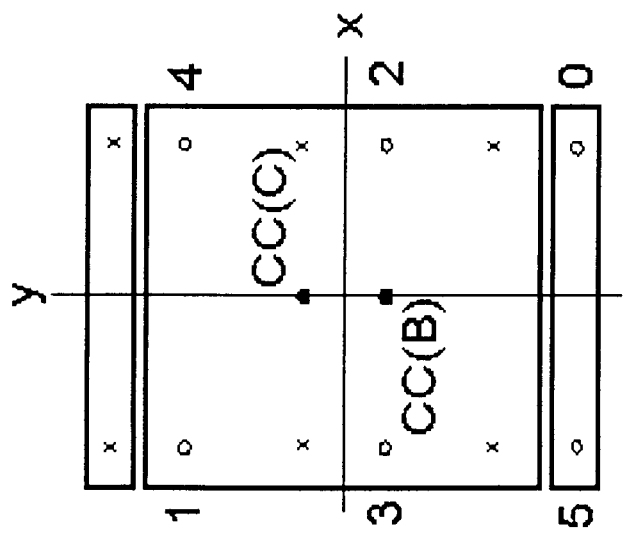
FIG. 17 is another diagram showing spot location on a deformable mirror device in accordance with one embodiment of the present invention.

The second specific case arises when $y_o$ is an odd multiple of $\delta$, $y_o=n_o\delta(n_o$ odd). Then for each spot in one column there is a spot opposite it in the other column. The input spot is on the bottom turning mirror and so is the output spot. There are still n−1 spots on the SLM. This situation can be illustrated for n=5 in FIG. 17. It is possible to fill in the gaps between the spots in the two columns. That can be accomplished by putting an input spot on the top turning mirror at location $(x_o, -y_o)$ with light directed towards Mirror C. For both configurations one can fill the SLM with spots by using many spots on the turning mirrors.

Generally, it is desired to have the spots close together to utilize the SLM area in an optimum fashion. If the SLM is divided into independent areas called pixels then it would be preferred to have one spot per pixel. Let the spot size be $\sigma$. Since the spots are separated by a vertical distance of $2\delta$, it may be preferred that $\sigma=2\delta$, i.e. the distance between the centers of curvature of mirrors B and C should be equal to the spot size. The spots may also be separated by a distance $2\delta$ in the horizontal direction.

The number of bounces on the SLM was taken to be equal to the number of spots from top to bottom on the SLM. This may well not be the case. In many situations the number of spots from top to bottom on the SLM may be of the order of many hundreds but on₁y tens of bounces may be desired. In that case, groups of spots can bounce back and forth in synchronization. Two examples can be considered. There can be sets of spots arranged in columns being reflected, or other array of spots being reflected. In both cases the set of spots can be reflected five times off the SLM. The use of spot arrays allows one to make most effective use of the SLM capabilities.

The time delays possible with the dual cell are also considered. As described, there are a number of beams, each executing n bounces. Each beam can go to either Cell I, which includes Mirrors B or C, or go to Cell II, i.e. Mirrors E or F. To derive the expression for the time delays, $D_{BC}$ is defined to be the optical distance in Cell I, i.e. from the SLM to Mirror B or C and back. $D_{EF}$ is defined to be the optical distance in Cell II, i.e., from the SLM to Mirror E or F and back. $d_{BC}$ is the distance from the cell lens to either Mirror B or Mirror C, and the corresponding distance in to Mirrors E and F to be $d_{EF}$.

$$D_{BC}=2n_1d_1+2d_{BC}$$

$$D_{EF}=2n_1d_1+2\,d_{EF}$$

Here, $n_1$ and $d_1$ are the refractive index and size of the prism respectively. As before, the light leaving the SLM can be controlled by the polarization change at each pixel to go to either cell. If there are k=n−1 total bounces off the SLM and i of these bounces go to Cell II, then k−i bounces go to Cell I. The total time delay, T, is given by $T=(1/c)((k-i)D_{BC}+iD_{EF})=(1/c)(kD_{BC}+i(D_{EF}-D_{BC}))$. There are three items of interest in this equation. The equation has two terms. The first term is proportional to m and is constant. Thus there is always a constant time delay, $T_C=(1/c)\,mD_{BC}$ in this device. The second term is proportional to i and is variable. This controlled incremental part, $T_1$, proportional to i, is added to the constant part, giving $T_1=+(i/c)(D_{EF}-D_{BC})$. Increasing i by one unit increases the transit time by an increment, $\Delta T$ given by $\Delta T=(1/c)(D_{EF}-D_{BC})$. Thus the time delay increment, $\Delta T$, is given by the path difference between Cell II and Cell I. This can be made to take on a wide range of values.

The time increment, $\Delta T$, can be expressed in terms of design parameters, $d_{BC}$, $d_{EF}$, $f_1$, and $f_2$. $D_{BC}$ and $D_{EF}$ can be replaced using previous equations. $d_1$ can then be eliminated in each cell using a previous imaging condition, written with d replaced by $d_{BC}$ for Cell I and by $d_{EF}$ for cell II. The result is $$\Delta T=\{2(n_1^2+1)(d_{BC}-d_{EF})+2n_1^2([d^2{}_{BC}/2f_1]-[d^2{}_{EF}/2f_2])\}$$

This reduces as expected. If $d_{BC}\rightarrow d_{EF}$ and $f_1\rightarrow f_2$ then Cell I becomes identical with Cell II and $\Delta T\rightarrow 0$. There are k possible values for i, so there are k possible time delays and the maximum incremental delay, $T_{1,max}$ given by $T_{1,max}=k\Delta T$. Thus the maximum incremental delay is proportional to the maximum number of bounces. This is improved in other designs of the present disclosure.

The dual arm cell can again be extended. As before, the distances $d_{BC}$ and $d_{EF}$ to the pairs of White Cell mirrors are made unequal. The optical distance from the SLM to Mirror F is made greater than that from the SLM to Mirror E. These have the advantage of increased flexibility in the choice of possible delays. The number of possible delays will go as $k^2$ where k is the number of bounces off the SLM.

FIG. 4 is identical to the configuration of FIG. 3 with the exception that Mirror F has been replaced with Lenses G1 25*c* and G2 25*b* and Mirror G3 25*a*. Of these, Lens G1. is chosen so that, in conjunction with Lens F2, the SLM is imaged onto Lens G2. Thus, Lens G2 is conjugate with the SLM. Lens G2 is chosen to image the plane of Lens G1 onto Mirror G3 with unit magnification, so that Mirror G3 is conjugate with the plane of Mirror G1, which is also conjugate to Mirror E. Mirror G3 is chosen to have its center of curvature on Lens G2. The image of its center of curvature then also lies on the SLM, and is located so that the spots bounce as mentioned previously. The imaging conditions of the dual arm cell are still satisfied. An alternative configuration with lenses G1 and G2 replaced by mirrors is also included in the present disclosure. Further, G1 and G2 may be combined into a single lens.

One main improvement comes from the different transit time for light in the arm containing Lenses G1 and .G2 and Mirror G3. In addition to $D_{BC}$ and $D_{EF}$ there is a new distance, the optical distance $D_{EG}$ from the SLM to Mirror G3 and back where $D_{EG}=2n_1 d_1+2d_{EG}$, $n_1$ and $d_1$ being the refractive index and size of the prism as defined previously. Then $d_{EG}$ can be written in terms of $f_{G3}$ the focal length of Mirror G3 as $d_{EG}=d_{EF}+2f_{G3}$. A configuration then exists with the optical distances from the SLM to Mirrors B and C equal but the distances from the SLM to Mirrors E and G unequal. To proceed, it is necessary to know the number of bounces a given spot will make off the SLM. As before, the number of bounces is designated n, and for the sake of discussion it is assumed there are an even number of bounces. The difference in transit times between the SLM and Mirrors B or C and Mirror E is then set equal to the smallest desired time increment, $\Delta T$. The difference in transit times between Mirrors B or C and Mirror G3 is set to $((n/2)+1)\Delta T$, where $\Delta T=(1/c)(D_{EG}-D_{BC})$. These times are accomplished by choice of focal lengths for the various elements. The reason for these choices will be made apparent. Since $\Delta T$ is a difference in lengths, it can be made quite small.

In examining the possible sequences of bounces on the SLM, it can be assumed that the spot starts on the turning mirror next to the SLM and goes first to Mirror B and back to the SLM. From the SLM there are two choices, towards either Mirror C or Mirror G, depending on the polarization of the light leaving the SLM. Upon return the light can either go to Mirror B or Mirror E. After odd-numbered bounces off the SLM, the light can go to either Mirrors C or G. After even-numbered bounces off the SLM, the light can go to either Mirrors B or E. The light bounces half the time off Mirrors B or E and half the time off Mirrors C or G. The shortest transit time occurs when the light always goes to Mirrors B and C and the longest transit time occurs when the light always goes to Mirrors E and G.

The transit time for a given sequence of bounces can then be expressed by letting i be the number of bounces off Mirror E and j be the number of bounces off Mirror G. $0 \leq i,j \leq (n/2)$. Then the number of bounces off Mirrors B and C will be $((n/2)-i)$ and $((n/2)-j)$ respectively. The transit time for the n bounces going i times to Mirror E and j times to Mirror F, T(ij), is given by $$T(i,j) = (1/c)\{((n/2)-i)D_{BC} + iD_{EF} + ((n/2)-j)D_{BC} + jD_{EG}\}$$

$$= (1/c)\{nD_{BC} + i(D_{EF}-D_{BC}) + j(D_{EG}-D_{BC})\}$$

Or, using previous expressions, $T(i,j)=T_o+\Delta T(i+j((n/2)+1))$ where $T_o=(n/c)D_{BC}$. The first term, $T_o$, is a constant and represents a base minimum delay. It occurs when $i=j=0$. The progression of increasing delays is now shown. After $i=0$, the next delay occurs when $i=1, j=0$. i can continue to be incremented until $i=(n/2)$. Then set $i=0$, $j=1$ and start incrementing i again. This is identical to a radix system of base $(n/2)$. The longest delay occurs when $i=j=(n/2)$. It is $T\{(n/2), (n/2)\}=\Delta T\{(n/2)^2+2(n/2)\}$. As predicted, the maximum n is proportional to $n^2$.

A configuration that is optically identical to the previous configuration can be imagined, having Lenses G1 and G2 replaced with spherical mirrors F1 and F2. As before, Mirror F1, in conjunction with lens F2, images the SLM onto Mirror F2. Mirror F2 then images Mirror F1 onto Mirror G3. Finally, the center of curvature of Mirror G3 is centered on Mirror F2

The design of the dual armed TTD unit can additionally be modified to improve the number of potential time delays, where the number of delays can be proportional to $2^n$ rather than to $n^2$. The modification can be done in two parts: first by adding Auxiliary mirrors in the plane of the SLM, and then adding time delay mechanisms in conjunction with the auxiliary mirrors. The dual cell with auxiliary mirror is shown in FIG. 5 as a three-dimensional rendition of the dual cell. Added to it are two mirrors, one over the SLM called Auxiliary Mirror I, and an extra mirror or other reflective material over the edge of the beam-splitting cube, called Auxiliary Mirror II. The optical axis is between the SLM and Auxiliary Mirror I. Lens f1 has been made larger to cover the SLM and Auxiliary Mirror I. The turning mirrors are at the left of Auxiliary Mirror I and the SLM.

The operation is comparable to that of the dual cell with the plane of the SLM enlarged. The light starts on the Input Turning Mirror and goes first to Cell I. Mirrors B and C image the Input Turning Mirror spot onto the SLM. If the SLM does not change the polarization the light is imaged onto Auxiliary Mirror I and again onto the SLM. If the SLM changes the polarization, the light that is reflected off the beam-splitting cube is imaged onto Auxiliary Mirror 11. Light leaving Auxiliary Mirror II is similarly re-imaged back onto the SLM. Lens f1 images Mirror B onto Mirror C and lens f2 images Mirror E onto Mirror F, as before. Other configurations satisfying the same requirements but having various advantages are also presented in the present disclosure.

Figure 18:
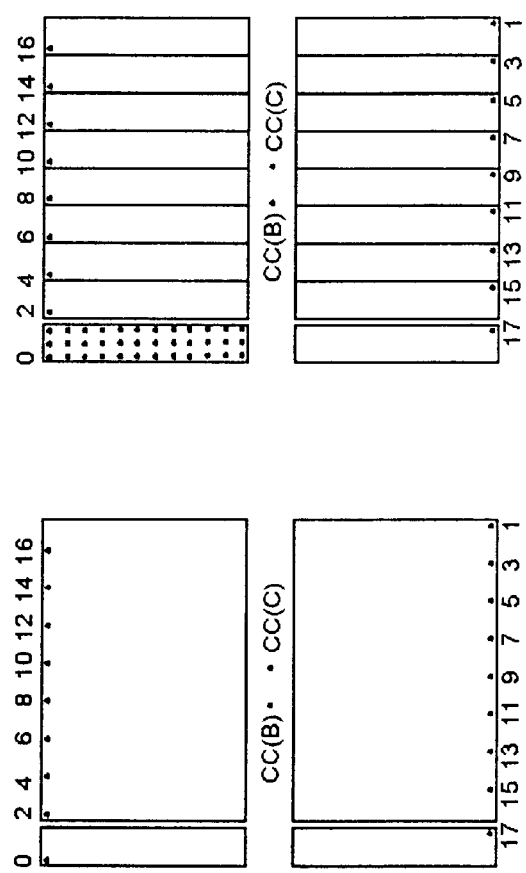
FIG. 18 is another diagram showing spot location on a deformable mirror device in accordance with one embodiment of the present invention.

The number of bounces on the SLM, m, is chosen to be equal to the number of bits of time delay required. For example if two hundred different time delays are desired, that would require eight bits, $m=8$, requiring eight bounces on the SLM. The SLM surface is then divided into m areas such that each beam falls once into each area. Thirty-six input spots are shown on the turning mirror in FIG. 18. Only the images associated with the upper left hand turning mirror spot are shown on the SLM and Auxiliary Mirror for simplicity.

The length of the path traveled by the beam can be changed in Cell II on the traverse in which it strikes each of the different areas. To discuss this approach, suppose Mirrors B and C are taken the same distance from the SLM as Mirrors E and F. Extra path length can be placed in front of or in place of each area of Auxiliary Mirror II. The methods of increasing the path length will be presented shortly. The distance associated with the increase in path length is chosen to be a binary function of some minimum distance, $\Delta L$, and $\Delta T$ is the minimum non-zero time delay. The relationship is given by $\Delta T=(2n_1/c) \Delta L$, where $n_i$ is the refractive index of the material in which the light probagates and c is the speed of light in vacuum. Thus the incremental time increase associated with first area on Auxiliary Mirror II is $\Delta T$, that with the second area is $2\Delta T$, that with the third area is $4\Delta T$, etc. The general expression for the time delay with this approach is $T=2mD_{BC}+\Delta T(\delta_1+2\delta_1+4\delta_3+ \ldots +2^{(m-1)}\delta_m)$ where the $\delta_1$ describe whether the i-th delay is added in. If $\delta_i=0$, light goes to Auxiliary Mirror I, if $\delta_i=1$ then light goes to Auxiliary Mirror II. There is a constant delay, $T_C=2mD_{BC}$. The factor of two in front of $D_{BC}$ occurs because the distance from the SLM to Auxiliary Mirror I and back required for this case is twice the distance from the SLM to Mirror B or Mirror C and back as required for the Dual Arm cell. There is also an incremental delay, $T_1=2\Delta T (\delta_1+2\delta_1+4\delta_3+ \ldots +2^{(m-1)}\delta_m)$. The maximum incremental delay, $T_{1,max}$ is given by $T_{1,max}=\Delta T(2^m-1)$. This is a considerable improvement. The incremental length, $\Delta L$ can be implemented in many ways. For small time increments, blocks of material such as glass can be added next to the auxiliary mirror. For larger time increments an optical transmission line of the desired length may be added.

The method of adding blocks of glass or other transparent material is shown in FIG. 5a, where blocks of glass of different thickness are shown. The blocks are oriented to replace Auxiliary Mirror II. The thickness of the blocks are chosen so that the additional time required for the beams to go through successive blocks increases as powers of two times the initial thickness. In operation, the light in a given beam goes either to each section of Auxiliary Mirror II and receives the associated delay, or goes to Auxiliary Mirror I and receives no delay. For example, on a particular pass through the cell suppose the beam's polarization is such that it passes through the beamsplitter. This beam goes to Mirror B or C, from which it goes to Auxiliary Mirror I, encounters no glass blocks, and receives no delay. If on that pass the beam's polarization has been changed, the beam goes to Mirrors E or F and thence to Auxiliary Mirror II where it passes through the associated extra optical distance of the glass block.

As before, $d_1$ and $n_1$, are the thickness and refractive index of the beamsplitting prism. Let f be the focal length of the White cell mirrors, and let d be the distance from lens f2 to the White cell mirrors E and F, as well as to mirrors B and C. The focal length f1 of cell lens f2 is set equal to $d_{EF}$. The distance $d_2$ from lens f1 to Auxiliary Mirror II is divided into two parts, $d'_2$ filled with glass of refractive index $n_2$, and $d''_2$, filled with air. This corresponds to a representative block of glass.

The expressions for the thickness of the air, $d''_2$ and thickness of the glass, $d'_2$ are given in terms of two parameters, the minimum distance between the lens and Auxiliary Mirror I $d_{2,min}$ and the minimum transit time, $T_{min}$, from the SLM to Auxiliary Mirror I. They are $d_{2,min}=2d_{EF}-(d^2_{EF}/f)-(d_1/n_1)$, which reduces to the single cell imaging case if the material along distance $d_2$ is changed to glass of index $n_1$ and $d_2 \rightarrow d_1$. For that case there is a minimum transit time from the SLM to Auxiliary Mirror I and back. It is $T_{min}=(2/c)(n_1 d_1+2d_{EF}+d_{2,min})=(2/c)(n_1 d_1+2d_{EF}+(2d_{EF}-(d^2_{EF}/f)-(d_1/n_1))$. Both the minimum distance and the minimum transit time occur if there is no glass, $d'_2=0$.

Then in terms of these parameters the thickness $d'_2$ of a glass block required for incremental time delay $T_1-T_{1,min}$ is given by $d'_2=\{n_2/(n_2^2-1)\}(c/2)(T_1-T_{1,min})$, and the total distance, $d_2$, from lens f1 to Auxiliary Mirror I is given by $d_2=d_{2,min}+\{1/(n_2+1)\}(c/2)(T_1-T_{1,min})$. By setting $(T_1-T_{1,min})=2^{(i-1)}\Delta T$, these equations can then be used to calculate the thickness of the $i^{th}$ block. Alternatively, if all the dimensions are known, then the transit time can be calculated as $\Delta T=\{2(n_2+1)/c\}(d_2-d_{2,min})$. This is comparable to the previous equation for the dual cell. The approach using a glass block is good for very small delays. If the blocks get too long then the beams start to broaden and are vignetted by the edge of the block. In that case other approaches may be used.

One approach would be to use an array of optical fibers in place of the glass blocks.

The lens transmission line provides another method of generating time delays that may be appropriate when the delays are much longer than those allowed by the glass block method. The situation is shown in FIG. 9. There are five lens groups labeled 43a, 43b, 43c, 43d, and 43e, each group comprising three lenses. The plane on the right 44 is the input or object plane and is intended to be coincident with and replace the plane of Auxiliary Mirror II. Light that was reflected off Auxiliary Mirror II now proceeds to the left into the lens system. There are five planes conjugate to the plane of Auxiliary mirror II, labeled 45a, 45b, 45c, 45d, and 45e, lying at the junctions of the five lens groups. FIG. 10 shows the plane of Auxiliary Mirror II and the five conjugate planes in three dimensions. As all the groups may operate identically, only one group will be considered. Recall that at the input to a group and the output to a group there is a plane conjugate to Auxiliary Mirror II (and therefore to the SLM). There are three imaging tasks performed by a group. The first task is basic to the operation and will be considered immediately. The other two tasks deal with light conservation.

The first possible task of a lens group is to image the input conjugate plane onto the output conjugate plane. The lens in the center performs that operation. The focal length of the lens, f, can be separated from both conjugate planes by a distance 2f. This can produce the desired imaging. The input and output conjugate planes are related by a magnification of −1.

In operation, a portion of the areas of each conjugate plane are replaced by vertical strip mirrors. These areas correspond to the areas of the glass blocks in the previous design. This is seen in FIG. 11 where the shaded areas correspond to the mirrors. Light incident in Area I of the plane of Auxiliary Mirror II passes through it and Group G1, and is reflected at conjugate plane 45a by the vertical strip mirror placed to cover the image of Area 1. Light passing through Area II of the plane of Auxiliary Mirror II passes through Lens Groups 43a and 43b, and is reflected by a mirror placed in Conjugate Plane 45b at the image of Area II. Similarly, light in areas III, IV, and V is reflected by mirrors strategically placed in Conjugate Planes 45c, 45d, and 45e.

The length of the lens groups determines the time delays. The length of the first lens group may be chosen so that the light that travels through Lens Group 1, reflects from the strip mirror in Conjugate Plane 45a, and travels back has the shortest desired time, $\Delta T$. The length of the second group is equal to that of the first group so that the transit time through groups 43a and 43b and back is $2\Delta T$. The length of each successive group is then made equal to the sum of the lengths of the preceding groups. The length of group 43c is made equal to the sum of the lengths groups 43a and 43b. The transit time then up through Group 43c up to Conjugate Plane 45c and back is $4\Delta T$ as desired. The remaining lengths are chosen accordingly so that light passing up through Group m to Conjugate Plane m and back has a time delay $2^{(m-1)}\Delta T$.

Returning to the other two tasks performed by the lens groups, the second task involves conserving optical throughput. There have been situations where it was be desired to put a plane mirror in the conjugate plane next to the left-hand lens of the group to reflect light back through the system. It will be desirable to have all the light that comes through the center-imaging lens to go back through that lens. To accomplish this, the left-hand lens in each group is chosen so that when the plane mirror is placed next to it, it then images the center lens onto itself. This may be accomplished by letting the focal length of the left-hand lens be equal to the distance of that lens from the center lens. The lens and plane mirror combination will have a focal length of half the center-to-left hand lens distance and there is a magnification of −1 so that the edges of the center lens are indeed imaged onto themselves. Another way of considering the operation of the left-hand lens arises because its focal point is on the center-imaging lens. The left-hand lens collimates light leaving any point on the center-imaging lens. It is still collimated after being reflected by the plane mirror so upon return it is refocused by the left-hand lens back onto the center-imaging lens. The left-hand lens is in actuality a field lens placed next to the output conjugate plane. Since it is next to the conjugate plane it does not affect the imaging of the center lens onto that plane.

The third task performed by a lens group is again devoted to conserving light. It is to assure that all the light entering the center imaging lens of one group left the center imaging lens of the proceeding group. To do this, the center lens of one group can be made the image of the center lens of the proceeding lens. This can be accomplished by properly choosing the right hand lens of the group so that, when combined with the left-hand lens of the preceding group, the desired imaging is produced. This can be accomplished by making the focal length of the right hand lens equal to the distance between the right hand lens and the center lens, so that the focal point of the right hand lens is on the center lens. Light leaving a point on the center lens of one group is then collimated by the left hand lens and refocused by the right hand lens of the next group onto the center imaging lens of the next group. There is one minor exception: the first lens in the first group images Mirrors E or F onto the central imaging lens of the first group. With these three imaging conditions, a given conjugate plane is imaged onto the next conjugate plane and no light is lost through aperturing of the center imaging lenses. The process can be extended if more delays are desired with more groups and more areas on Auxiliary Mirror II and its conjugate planes.

In a system of lens groups, alternatively known as a lens train', the segmented mirrors can optionally be replaced with gratings that reflect one wavelength and pass all others, such as a Bragg grating. Then for a beam bouncing through the White cell, the delay it experiences would depend on its wavelength. One could use a tunable laser to program in the delay by changing the wavelength of the device. Such a cell would not require a spatial light modulator or a dual White cell, just a single White cell with the lens train in place of Mirror A, where the SLM used to be.

There are other approaches that use tunable lasers to map delay to wavelength. In one such approach light is projected down a fiber containing Bragg gratings tuned for different wavelengths. Depending on the wavelength of the beam at any instant, the light travels down the fiber a different distance to the correct wavelength-specific grating, passing through all the other gratings, and gets reflected back. A tunable laser or wavelength-altering element may be required for each antenna element in this approach.

A Deformable Mirror Device spatial light modulator (DMD) is also used in the present invention. The DMD has the potential advantages of higher'information density and faster speed. But it also has some associated problems that have to be addressed. The DMD is a pixilated spatial light modulator. That is, the reflecting surface is divided into incremental image areas. Each image element has a mirror surface that can be independently rotated to two positions, for example making angles of ±10° with the surface. The elements can modulate the direction of the reflected light by changing the input direction to one of two output directions. It does this by individual image element. The direction change can be transformed into an amplitude change by directing the reflected light through an aperture or directing it to something blocking it. Pulsing the mirror between transmitting and blocked states, at a rate faster than eye response, can also change the average observed amplitude.

Imagine a cut through the DMD surface, where the individual mirrored image elements are shown. Some are rotated in one direction, the remaining mirror elements in the other possible direction. The angle, θ, of tip is ±10° on presently available devices so that light incident normal to the plane of the DMD is reflected from a given image element at ±20°. The reflective image elements or pixels are currently square, 16 μm on a side with a spacing of 17 μm between centers. There is a hole in the center of each image element roughly 6 μm in diameter. The pixels rotate about a diagonal. The light incident perpendicular to the paper is reflected in the ±x direction.

Figure 19B:
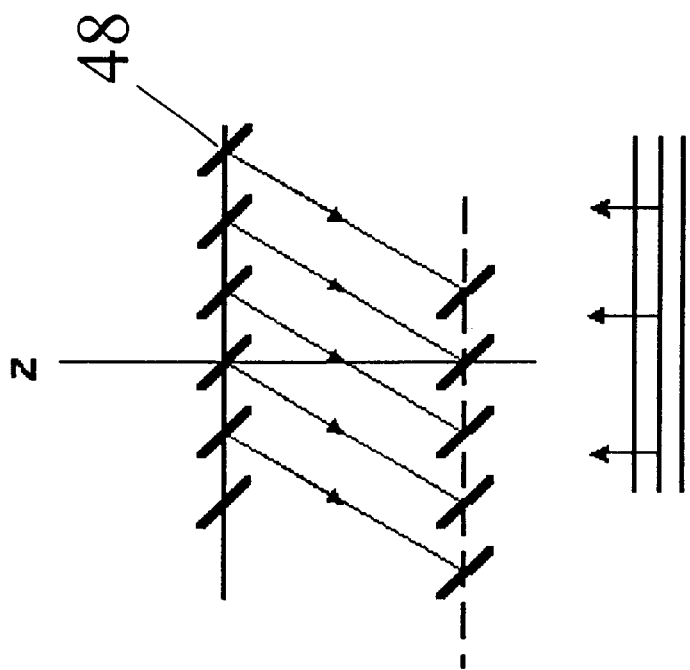
FIG. 19b is another diagram of reflected planes in accordance with one embodiment of the present invention.
Figure 19A:
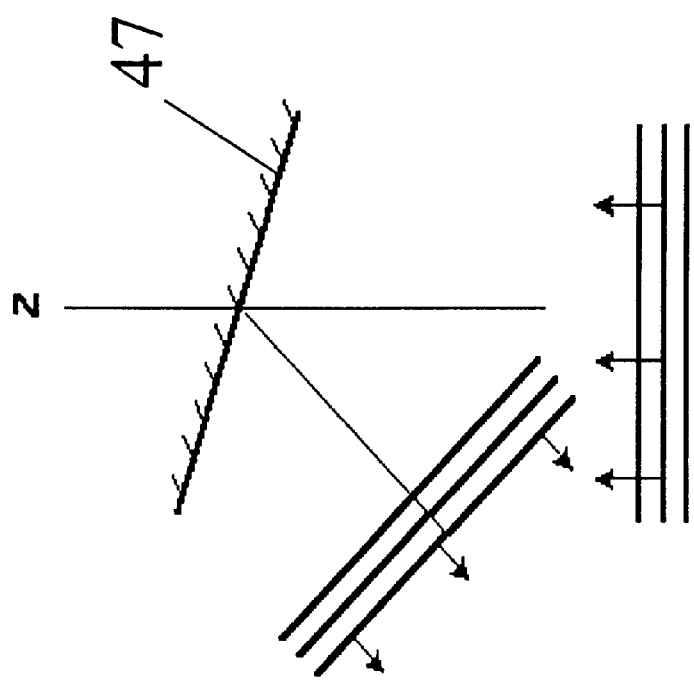
FIG. 19a is a diagram of reflected planes in accordance with one embodiment of the present invention.

The DMD presents an interesting pattern on reflection. To see this, compare it to a flat mirror 47 as shown in FIG. 19a. The intersection of the mirror surface with the x-z plane makes an angle α with the x-axis. A plane wave travelling in the z direction enters at the bottom, is reflected off the mirror, and exits to the lower left. This is in the near field of the mirror. A continuous reflected wavefront results as expected. Considering a plane wave reflected off the DMD 48, as shown in FIG. 19b, the image element mirror surfaces are all oriented in the same direction for simplicity. The mirror surfaces do not form a continuous surface as in the case of the extended plane mirror. As a result the field reflected off the DMD is a discontinuous set of wavefronts all travelling in the same direction but with some lagging behind. The discontinuous set forms an "average" plane parallel to the plane of the DMD. However, this average plane is not perpendicular to the direction of propagation of the reflected light.

The fact that the elements of the DMD do not lie in one continuous surface makes it more difficult at times to image the DMD in reflected light. The difficulty is shown in FIG. 20a. A DMD 49 at the left is normally illuminated with a beam from the right. The reflected light is imaged with a lens 50. Neither the object plane nor the image plane is perpendicular to the direction of propagation of the light leaving the DMD. Indeed the object plane and image plane are parallel only if the magnification is unity or if the lens is rotated to be parallel to the object plane. The main problem is that the object and image planes are not perpendicular to the direction of propagation.

Figure 20B:
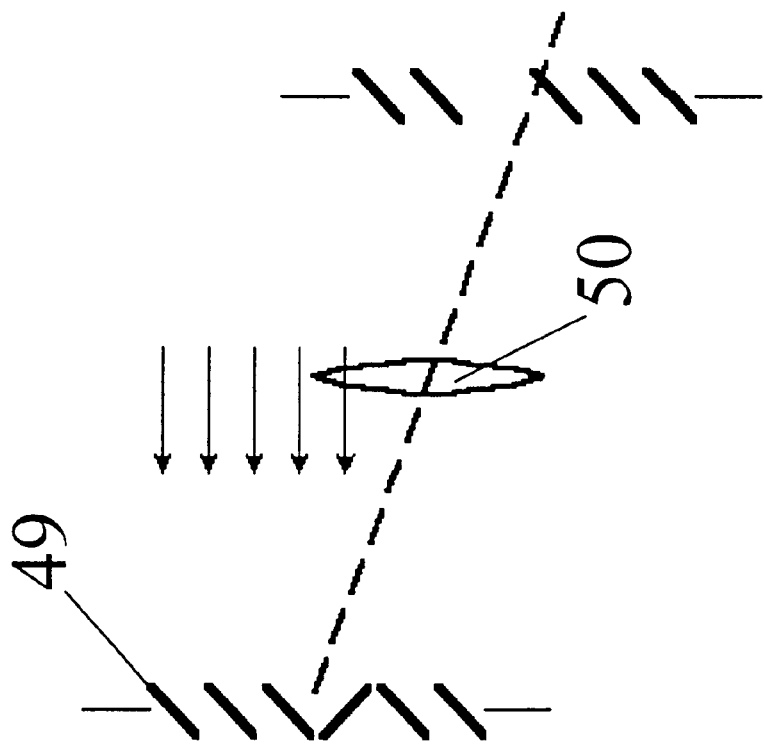
FIG. 20b is another diagram of a light beam incident on a DMD in accordance with one embodiment of the present invention.
Figure 20A:
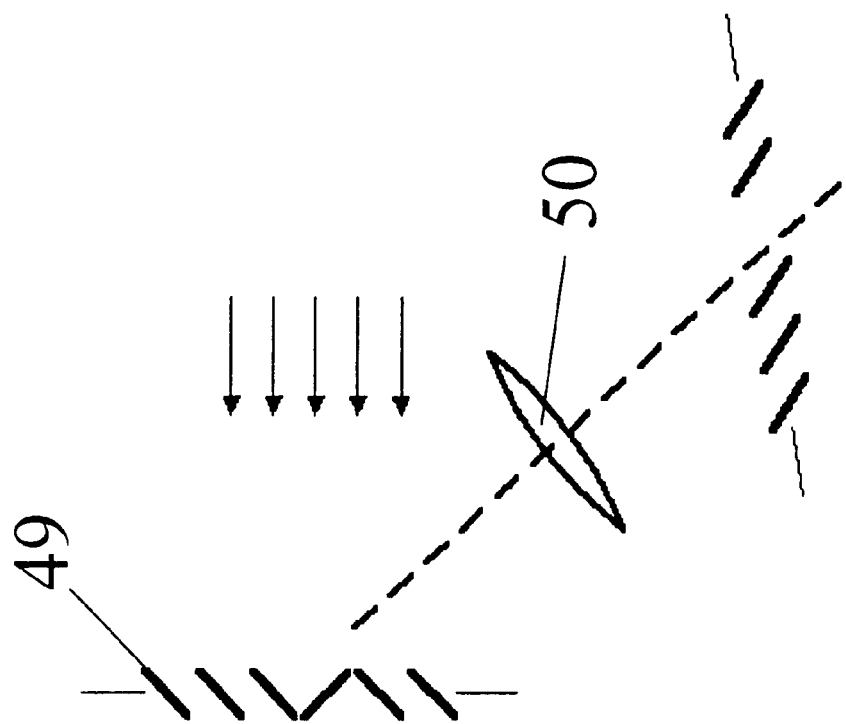
FIG. 20a is a diagram of a light beam incident on a DMD in accordance with one embodiment of the present invention.

If the direction of the light were reversed so as to be incident on the DMD 49 at an angle and leaving it perpendicular to the surface, as shown in FIG. 20b, then there would be no problem. That is the way projectors using the DMD operate. For application in a White cell, however, it may be necessary to have light approaching the SLM from both directions.

One way to remedy the problem of the object plane and image plane not being perpendicular to the direction of propagation is to use an associated prism to change the direction, as shown in FIG. 6. The DMD is illuminated with light normal to its surface as before, and a prism is placed in the reflected beam. The directions and the angles of the prism have been adjusted to remove the angular offset of the DMD. The lens is then used in a normal fashion.

The effect of the prism can be demonstrated analytically. To do this, a ray matrix description is utilized. A ray with slope $p_o$ incident on a DMD mirror/pixel leaves the pixel with slope $p_1$. The 3×3 ray matrix for the DMD whose mirror elements are tipped by ±θ is given by $$\begin{pmatrix} y_1 \\ p_1 \\ 1 \end{pmatrix} = \begin{pmatrix} 1 & 0 & 0 \\ 0 & 1 & \pm 2\theta \\ 0 & 0 & 1 \end{pmatrix} \begin{pmatrix} y_o \\ p_o \\ 1 \end{pmatrix}$$

The first of the three linear equations represented by the matrix equation shows that upon reflection the position of the ray remains constant and the second linear equation shows that the slope changes direction by ±2θ. Similarly, it has been shown that for the prism the ray matrix for a prism of small angle α and index $n_1$ is given by $$\begin{pmatrix} y_1 \\ p_1 \\ 1 \end{pmatrix} = \begin{pmatrix} 1 & 0 & 0 \\ 0 & 0 & (n-1)\alpha \\ 0 & 0 & 1 \end{pmatrix} \begin{pmatrix} y_o \\ p_o \\ 1 \end{pmatrix}$$

Return to the situation in FIG. 6 where a DMD is on the left so that the light is reflected upward, translates a distance d and passes through the prism. The effect of the angle on the DMD can be cancelled. To find the conditions, multiply the matrices for the DMD, the translation and the prism and accept that the product be equivalent to that for the translation by itself. Thus, $$\begin{pmatrix} y_1 \\ p_1 \\ 1 \end{pmatrix} = \begin{pmatrix} 1 & 0 & 0 \\ 0 & 0 & -(n-1)\alpha \\ 0 & 0 & 1 \end{pmatrix} \begin{pmatrix} 1 & d & 0 \\ 0 & 1 & 0 \\ 0 & 0 & 1 \end{pmatrix} \begin{pmatrix} 1 & 0 & 0 \\ 0 & 1 & +2\theta \\ 0 & 0 & 1 \end{pmatrix} \begin{pmatrix} y_o \\ p_o \\ 1 \end{pmatrix}$$

$$= \begin{pmatrix} 1 & d & +2\theta d \\ 0 & 1 & 2\theta - (n-1)\alpha \\ 0 & 0 & 1 \end{pmatrix} \begin{pmatrix} y_o \\ p_o \\ 1 \end{pmatrix}$$

It is seen by taking the product that the angular offset of the DMD is cancelled if $\alpha = 2\theta/(n-1)$. The horizontal axis is then translated upward in the y direction by a distance $y_d = +2d\theta$. The axis is selected by choosing for the position and input slope $y_o = 0$ and $p_o = 0$. Using these in the previous equations, we find the output position is $y_1 = +2d\theta$. This is reasonable because the axis has been raised by a distance $y_d = 2d\theta$ in translating a distance d. To compensate for this, set $y_1 = y_2 - y_d = y_2 - 2\theta d$. This affects only the top line in the above equation. The result is the following matrix equation. Note that the equation has the form of a simple translation by a distance d.

$$\begin{pmatrix} y_1 \\ p_1 \\ 1 \end{pmatrix} = \begin{pmatrix} 1 & d & 0 \\ 0 & 1 & 0 \\ 0 & 0 & 1 \end{pmatrix} \begin{pmatrix} y_o \\ p_o \\ 1 \end{pmatrix}$$

Thus, with the redefined axis the prism compensates nicely for the angular deflection of the DMD.

The equivalent of the Dual White Cell with unequal arms using the DMD is shown in FIG. 7. There the DMD 31 is at the left and to the right of the DMD are lens f1 36 and spherical Mirror C 35. There are two paths, depending whether a given pixel reflects light up or down. For light reflected downwards there are prism $P_1$ 37, lens f2 38 and Spherical Mirror B 39. For light reflected upward, there are Prism $P_2$ 32, lens $f'_2$ 33 and Mirror M 34. The prisms counteract the angular effects of the DMD as described. Of the two sets of conditions, the SLM-imaging conditions, and the light-conserving conditions, it is simpler to consider the light-conserving conditions first. The light-conserving conditions are that Spherical Mirrors B, C, and M be imaged onto each other and no light is lost going around the outsides of Mirrors B, C or M. This is accomplished by placing Mirrors B, C, and M in the focal planes of Lenses $f_2$, $f_1$, and $f'_2$ respectively. The curvatures of Mirrors B, C, and M are all chosen so that in conjunction with lenses $f_2$, $f_1$, and $f'_2$ the DMD is imaged back onto itself. As has been shown, images of the centers of curvature of Mirrors B, C and M through Lenses $f_1$, $f_2$, and $f'_2$ lie on the DMD. The result is the equivalent of the dual cell in FIG. 3 with equal arms. The light can go from Mirror C to Mirror B and back or from Mirror C to Mirror M and back depending on the state of a given pixel. The DMD decides between the two paths on any particular bounce.

For the DMD imaging conditions, Lens $f_3$ can be chosen to image the DMD onto Lens $f_4$ and the radius of curvature of Spherical Mirror D chosen so that its center of curvature is on Lens $f_4$. As a result, light coming from the DMD is imaged by Lens $f_3$ onto Lens $f_4$, then re-imaged by Spherical Mirror D back onto Lens $f_4$ and imaged by Lens $f_3$ back onto itself as required. Equivalently, since the center of curvature of Spherical Mirror lies on Lens $f_4$, it is imaged by Lens $f_3$ onto the DMD as required.

In operation, light comes in from an input source below the unit. Light from the outside source is imaged onto a pixel in the "down" position which acts as a turning mirror. That pixel directs the light to Spherical Mirror 34 which then images it onto a pixel in the "up" position. The pixel then directs the light to Spherical Mirror 35 which images it back to the DMD. The light is now considered to be "in the unit". The choices of tip of the DMD to direct to light to the short path of Spherical Mirror 34 and back to Spherical Mirror 35 or to the long path of Spherical Mirror 39 and back to Mirror 35, as can be appreciated from the array shown in FIG. 7. After the last bounce off Spherical Mirror 35, the light goes to Spherical Mirror 39 and to a pixel on the DMD which is in the "up" position and directs the light out of the cell.

The distance from the DMD to the lenses $f_1$, $f_2$, and $f'_2$ is designated $d_o$, and the focal lengths of Lenses $f_1$, $f_2$, and $f'_2$ can be taken to be equal. Starting from the turning mirror pixel, light travels a distance $4(d_o + f_1)$ to Spherical Mirror B and back and then to Spherical Mirror C and back to get "into the system". The light can go either to Mirror B and back and to Mirror C and back, a distance of $4(d_o + f_1)$ or it can go to Mirror D and back and then to Mirror C and back, a distance of $4(d_o + f_1) + 8f_4$. To exit the system, the light goes to Mirror D and to the turning pixel, a distance of $2(d_o + f_1) + 8f_4$. Then if there are m bounces, $m_2$ of which are switched to Mirror D, the expression for the transit time through the cell is $$T = (1/c)\{4(d_o + f_1) + ((m - m_2)4(d_o + f_1) + m_2 4(d_o + f_1 + 2f_4)) + 2(d_o + f_1 + 2f_4)\} = T_o + m_2 \Delta T$$

where the constant part, $T_o$, and the adjustable part, $\Delta T$ are given by $$T_o = (1/c)(6(d_o + f_1) + 8f_4 + m4(d_o + f_1))$$

$$\Delta T = (1/c)8m_2 f_4$$

The time increment is $(1/c)8m_2 f_4$ and there are $m_2$ choices, as before.

The binary cell of FIG. 5 is considered next, with auxiliary mirrors and a means for extending distances. The equivalent of FIG. 5 with the auxiliary mirrors is shown in FIG. 8. FIG. 8 is derived from the equal arm cell made with the DMD. The difference is that Spherical Mirrors B and M have been realigned so that the DMD is imaged onto the auxiliary mirrors rather than back onto itself. The transition to DMD-based optics has been made. All that remains is to add the either the glass blocks or the optical waveguide. The area of Auxiliary Mirror II can then be divided into strips. Auxiliary Mirror II can now be removed and replaced with the glass blocks or the lens waveguide. In FIG. 11, Auxiliary Mirror II has been removed and replaced with the entrance to the lens waveguide. The operation is the same as described in the dual arm binary device.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. An apparatus for optically generating time delays in signals comprising:
    (a) an input light source, said input light source adapted to generate at least one individual light beam from at least one direction;
    (b) an input mirror adapted to reflect said at least one individual light beam;
    (c) a plurality of optical elements configured so as to define a plurality of possible light paths for each said light beam reflected by said input mirror;
    (d) at least one refocusing optical element adapted to restrict the divergence of a light beam diverted by said optical elements through at least one of said light paths;
    (e) a spatial light modulator adapted to select a path from among said light paths for each pass of a said light beam through said optical elements;
    (f) an output mirror adapted to reflect each said light beam emerging from said optical elements; and
    (g) at least one receiving device adapted to receive a said light beam reflected by said output mirror and determine the delay in the light beam;
        wherein at least said spatial light modulator is encountered at least twice by each said light beam from free-space before emerging from said optical elements to said output mirror.

2. An apparatus according to claim 1 wherein at least one of said plurality of optical elements is encountered by a said light beam so as to form an array of intersection light points.

3. An apparatus according to claim 1 wherein said input mirror is adjustable.

4. An apparatus according to claim 1 wherein said plurality of optical elements is selected from the group consisting of mirrors, lenses, gratings, and prisms.

5. An apparatus according to claim 1 wherein said output mirror is adjustable.

6. An apparatus according to claim 1 additionally comprising at least one system of waveguides, said waveguides adapted such that the lengths of a plurality of said light paths may be varied in a fixed space comprising a subset of said optical elements.

7. An apparatus according to claim 1 wherein said spatial light modulator consists of a polarizing spatial light modulator adapted to change the polarization of a said light beam directed to said spatial light modulator.

8. An apparatus according to claim 7 additionally comprising a beam splitting device adapted to direct a said light beams along a said light path depending on the polarization of the light beam.

9. An apparatus according to claim 1 wherein said spatial light modulator consists of a deformable mirror device spatial light modulator adapted to reflect a said light beam to at least one of said plurality of light paths.

10. A method for optically generating time delays in signals, said method comprising the steps of:
    a) modulating an input signal onto an optical beam;
    b) passing said optical beam through an apparatus for optically generating time delays, said apparatus comprising:
        (i) an input mirror adapted to reflect said optical beam;
        (ii) a plurality of optical elements configured so as to define a plurality of possible light paths for said optical beam reflected by said input mirror;
        (iii) at least one refocusing optical element adapted to restrict the divergence of said optical beam diverted by said optical elements through at least one of said light paths;
        (iv) a spatial light modulator adapted to select a path from among said light paths for each pass of said optical beam through said optical elements, wherein at least said spatial light modulator is encountered at least twice by each said light beam from free-space before emerging from said optical elements to an output mirror; and
        (v) an output mirror adapted to reflect said optical beam emerging from said set of optical elements; and
    c) down-converting said optical beam to an output signal.

11. A method according to claim 10 additionally comprising the step of adjusting said input mirror to appropriately direct said optical beam into said set of optical elements.

12. A method according to claim 10 additionally comprising the step of adjusting said output mirror to appropriately direct said optical beam emerging from said set of optical elements.

13. A method according to claim 10 additionally comprising the step of receiving said optical beam reflected by said output mirror and determining said delay.

14. A method according to claim 10 wherein said apparatus additionally comprises at least one system of waveguides, said waveguides adapted such that the lengths of a plurality of said light paths may be varied in a fixed space comprising a subset of said optical elements.

15. An apparatus according to claim 10 wherein said spatial light modulator consists of a polarizing spatial light modulator adapted to change the polarization of a said optical beam directed to said spatial light modulator.

16. An apparatus according to claim 15 additionally comprising a beam splitting device adapted to direct a said optical beam along a said light path depending on the polarization of the optical beam.

17. An apparatus according to claim 10 wherein said spatial light modulator consists of a deformable mirror device spatial light modulator adapted to reflect a said optical beam to at least one of said plurality of light paths.

18. An apparatus according to claim 1 additionally comprising at least a second input light source, said at least a second input light source adapted to generate at least one individual light beam from at least one direction.

19. An apparatus according to claim 18 wherein said input light source and said at least a second input light source create an array of intersection light points on at least one optical element.

20. An apparatus according to claim 1 wherein each said light beam reflected by said input mirror produces an array of intersection light points using no fewer than two of said optical elements.

21. An apparatus for optically generating time delays in signals comprising:
- an input device for receiving at least one individual light beam from a light beam source, said input device capable of reflecting said at least one individual light beam;
- a plurality of optical elements configured to define a plurality of possible light paths for each said light beam reflected by said input device wherein each said light path of said plurality defines a distance, wherein one of said light paths of said plurality defines a path of shortest distance, said plurality of optical elements comprising:
  - (i) at least one refocusing optical element adapted to restrict divergence of a light beam diverted by an optical element of said plurality of optical elements; and
  - (ii) a spatial light modulator adapted to select a path from among said plurality of possible light paths for each said light beam encountering said spatial light modulator, wherein said spatial light modulator reflects each said beam of light through at least one path thereby generating a time delay prior to reflecting each said beam of light returning to said spatial light modulator from at least one of said plurality of optical elements in said path to an output device; and
- an output device for receiving each said beam of light from said spatial light modulator and for reflecting each said beam of light to a receiving device.

22. An apparatus according to claim 21 wherein said time delay is generated by reflecting said beam of light on a path of greater distance relative to said path of shortest distance.

23. An apparatus according to claim 21 wherein said input device is a mirror.

24. An apparatus according to claim 21 wherein said output device is a mirror.

25. An apparatus according to claim 21 wherein at least one optical element of said plurality of optical elements is selected from the group consisting of mirrors, lenses, gratings, beam splitters and wave guides.

26. An apparatus according to claim 21 wherein said spatial light modulator is selected from the group consisting of polarizing spatial light modulators and deformable mirror spatial light modulators.

27. A method for optically generating time delays in signals, said method comprising the steps of:
- modulating an input signal onto an optical beam;
- passing said optical beam through an apparatus for optically generating time delays, said apparatus comprising:
  - an input device for receiving at least one individual light beam from a light beam source, said input device capable of reflecting said at least one individual light beam;
  - a plurality of optical elements configured to define a plurality of possible light paths for each said light beam reflected by said input device wherein each said light path of said plurality defines a distance, wherein one of said light paths of said plurality defines a path of shortest distance, said plurality of optical elements comprising:
    - at least one refocusing optical element adapted to restrict divergence of a light beam diverted by an optical element of said plurality of optical elements; and
    - a spatial light modulator adapted to select a path from among said plurality of possible light paths for each said light beam encountering said spatial light modulator, wherein said spatial light modulator reflects each said beam of light through at least one path thereby generating a time delay prior to reflecting each said beam of light returning to said spatial light modulator from at least one of said plurality of optical elements in said path to an output device; and
  - an output device for receiving each said beam of light from said spatial light modulator and for reflecting each said beam of light to a receiving device; and
- down-converting said optical beam to an output signal.

* * * * *

UNITED STATES PATENT AND TRADEMARK OFFICE
CERTIFICATE OF CORRECTION

PATENT NO. : 6,388,815 B1 Page 1 of 1
DATED : May 14, 2002
INVENTOR(S) : Stuart Collins, Jr.

It is certified that error appears in the above-identified patent and that said Letters Patent is hereby corrected as shown below:

Column 10,
Line 15, please delete the symbol "- $y\tan\theta$" and replace it with -- $d=y\tan\theta$ --.
Line 31, please delete the symbol "$p_2$" and replace it with -- $p_1$ --.

Column 13,
Line 58, please delete the word "on1y" and replace it with -- only --.

Column 16,
Line 23, please delete the number "11" and replace it with -- II --.

Signed and Sealed this

Nineteenth Day of November, 2002

*Attest:*

JAMES E. ROGAN
*Attesting Officer* *Director of the United States Patent and Trademark Office*